(12) United States Patent
Han et al.

(10) Patent No.: US 11,006,024 B2
(45) Date of Patent: May 11, 2021

(54) POP-UP AND ROTATIONAL CAMERA AND ELECTRONIC DEVICE INCLUDING THE SAME

(71) Applicant: Samsung Electronics Co., Ltd., Gyeonggi-do (KR)

(72) Inventors: Wooseung Han, Gyeonggi-do (KR); Sangsik Park, Gyeonggi-do (KR); Junghyuck Im, Gyeonggi-do (KR); Minsu Jung, Gyeonggi-do (KR); Byunggun Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/681,444

(22) Filed: Nov. 12, 2019

(65) Prior Publication Data

US 2020/0154005 A1 May 14, 2020

(30) Foreign Application Priority Data

Nov. 9, 2018 (KR) .......................... 10-2018-0137676

(51) Int. Cl.
*H04N 5/225* (2006.01)
*F16M 11/10* (2006.01)
*G03B 15/03* (2021.01)
*H04M 1/02* (2006.01)

(52) U.S. Cl.
CPC ......... *H04N 5/2252* (2013.01); *F16M 11/105* (2013.01); *G03B 15/03* (2013.01); *H04N 5/2253* (2013.01); *H04M 1/0266* (2013.01); *H04M 2250/20* (2013.01); *H04N 5/2257* (2013.01)

(58) Field of Classification Search
None
See application file for complete search history.

(56) References Cited

U.S. PATENT DOCUMENTS

| 7,632,025 | B2 | 12/2009 | Sung et al. |
| 8,913,326 | B2 | 12/2014 | Kim |
| 10,419,589 | B2 * | 9/2019 | Fan ..................... H04M 1/0264 |

(Continued)

FOREIGN PATENT DOCUMENTS

| CN | 1897603 | 1/2007 |
| CN | 203590310 | 5/2014 |

(Continued)

OTHER PUBLICATIONS

European Search Report dated Feb. 24, 2020 issued in counterpart application No. 19208158.6-1208, 8 pages.

(Continued)

*Primary Examiner* — James M Hannett
(74) *Attorney, Agent, or Firm* — The Farrell Law Firm, P.C.

(57) ABSTRACT

An electronic device includes a housing, a display, at least part of which is included in the housing, a sliding part that includes an opening exposed to an outside area and that slides relative to the housing, and a camera module that is disposed in the opening and that rotates relative to the sliding part. The camera module is configured to rotate to face a first direction when the sliding part slides to a first position relative to the housing and to rotate to face a second direction different from the first direction when the sliding part slides to a second position relative to the housing.

20 Claims, 23 Drawing Sheets

(56) References Cited

U.S. PATENT DOCUMENTS

| | | | |
|---|---|---|---|
| 10,656,680 B2 | 5/2020 | Fan et al. | |
| 2005/0014527 A1* | 1/2005 | Chambers | H04N 5/2256 455/556.1 |
| 2005/0049019 A1 | 3/2005 | Lee | |
| 2006/0261257 A1* | 11/2006 | Hwang | H04N 5/2259 250/216 |
| 2007/0013555 A1* | 1/2007 | Sung | H04M 1/0264 340/937 |
| 2007/0273752 A1 | 11/2007 | Chambers et al. | |
| 2008/0194290 A1 | 8/2008 | Lebert et al. | |
| 2011/0281618 A1 | 11/2011 | Chambers et al. | |
| 2015/0189175 A1* | 7/2015 | Fan | H04N 5/23238 348/37 |
| 2017/0366652 A1* | 12/2017 | Boerckel | H04M 1/0264 |
| 2018/0109660 A1 | 4/2018 | Yoon et al. | |
| 2018/0262663 A1 | 9/2018 | Zhang | |
| 2019/0124187 A1* | 4/2019 | Zeng | H04M 1/0237 |
| 2019/0197863 A1 | 6/2019 | Kao | |
| 2019/0250667 A1* | 8/2019 | Fan | H04M 1/0264 |
| 2020/0084308 A1 | 3/2020 | Yoon et al. | |
| 2020/0177716 A1* | 6/2020 | Chen | H04M 1/0264 |

FOREIGN PATENT DOCUMENTS

| | | |
|---|---|---|
| CN | 203722706 | 7/2014 |
| CN | 106534406 | 3/2017 |
| CN | 107888809 | 4/2018 |
| CN | 207491002 | 6/2018 |
| CN | 108259728 | 7/2018 |
| CN | 207926665 | 9/2018 |
| EP | 1 701 518 | 9/2006 |
| EP | 2 584 382 | 4/2013 |
| KR | 1020020026013 | 4/2002 |
| KR | 20-0414532 | 4/2006 |
| KR | 1020070001461 | 1/2007 |
| KR | 1020070010453 | 1/2007 |
| KR | 10-0695260 | 3/2007 |
| WO | WO 2006/103595 | 10/2006 |

OTHER PUBLICATIONS

International Search Report dated Mar. 3, 2020 issued in counterpart application No. PCT/KR2019/015165, 10 pages.
Chinese Office Action dated Sep. 9, 2020 dated in counterpart application No. 201911088204.4, 28 pages.
European Search Report dated Sep. 18, 2020 dated in counterpart application No. 19208158.6-1208, 6 pages.
Chinese Office Action dated Mar. 29, 2021 issued in counterpart application No. 201911088204.4, 9 pages.

* cited by examiner

POP-UP AND ROTATIONAL CAMERA AND ELECTRONIC DEVICE INCLUDING THE SAME

CROSS-REFERENCE TO RELATED APPLICATION(S)

This application is based on and claims priority under 35 U.S.C. § 119 to Korean Patent Application No. 10-2018-0137676, filed on Nov. 9, 2018, in the Korean Intellectual Property Office, the disclosure of which is incorporated by reference herein its entirety.

BACKGROUND

1. Field

The disclosure generally relates to a camera technology used in an electronic device.

2. Description of Related Art

In recent years, an electronic device such as a digital camera, a digital camcorder, or a smartphone which includes a camera has been widely used. The electronic device including the camera may provide a photographing function. For example, the electronic device may output a preview image obtained from the camera on a display and may obtain an image taken with the camera according to an operation of a shutter.

The electronic device may be equipped with a plurality of cameras (e.g., at least one front camera and at least one rear camera). However, when a camera is disposed on a front surface of the electronic device, the display of the electronic device may not use a maximum area of the front surface of the electronic device.

SUMMARY

Aspects of the disclosure are to address at least the above-mentioned problems and/or disadvantages and to provide at least the advantages described below. Accordingly, an aspect of the disclosure is to provide an electronic device that uses one camera module as a front camera and a rear camera.

In accordance with an aspect of the present disclosure, an electronic device includes a housing, a display, at least part of which is included in the housing, a sliding part that includes an opening exposed to an outside area and that slides relative to the housing, and a camera module that is disposed in the opening and that rotates relative to the sliding part. The camera module is configured to rotate to face a first direction when the sliding part slides to a first position relative to the housing and rotate to face a second direction different from the first direction when the sliding part slides to a second position relative to the housing.

In accordance with another aspect of the present disclosure, an electronic device includes a housing including a first surface facing a first direction and a second surface facing a second direction opposite to the first direction, a display, at least part of which is included in the second surface of the housing, a sliding part including an opening and disposed on the first surface of the housing, in which the sliding part slides relative to the first surface, and a camera module disposed in the opening. The camera module is configured to continue to face the first direction in a state of being mounted in the sliding part, while the sliding part moves from an initial position to a first position of the housing and rotate to face the second direction from the first direction, while the sliding part moves from the first position to a second position relative to the housing.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
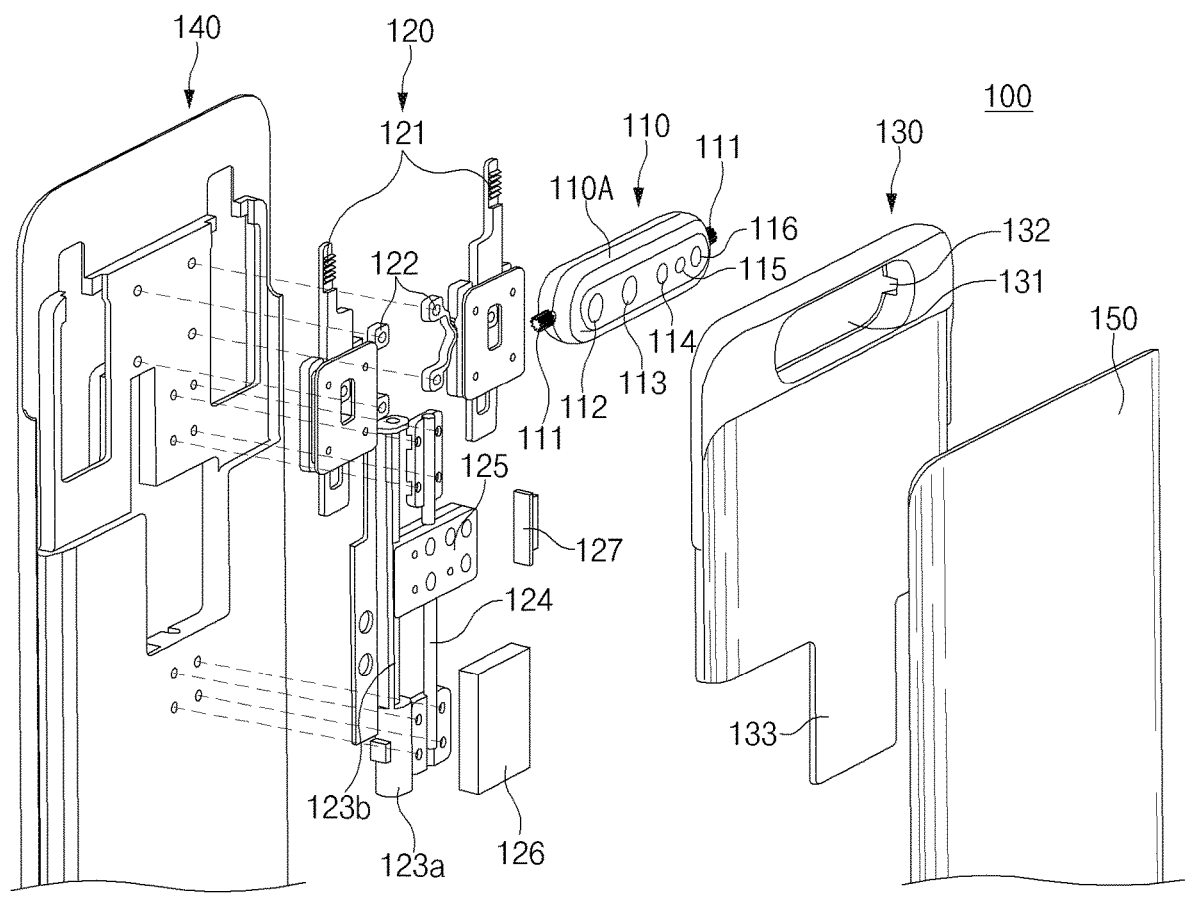
FIG. 1A is an exploded perspective view of an electronic device as viewed from a first side, according to an embodiment.

Various embodiments of the disclosure are described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

Figure 1B:
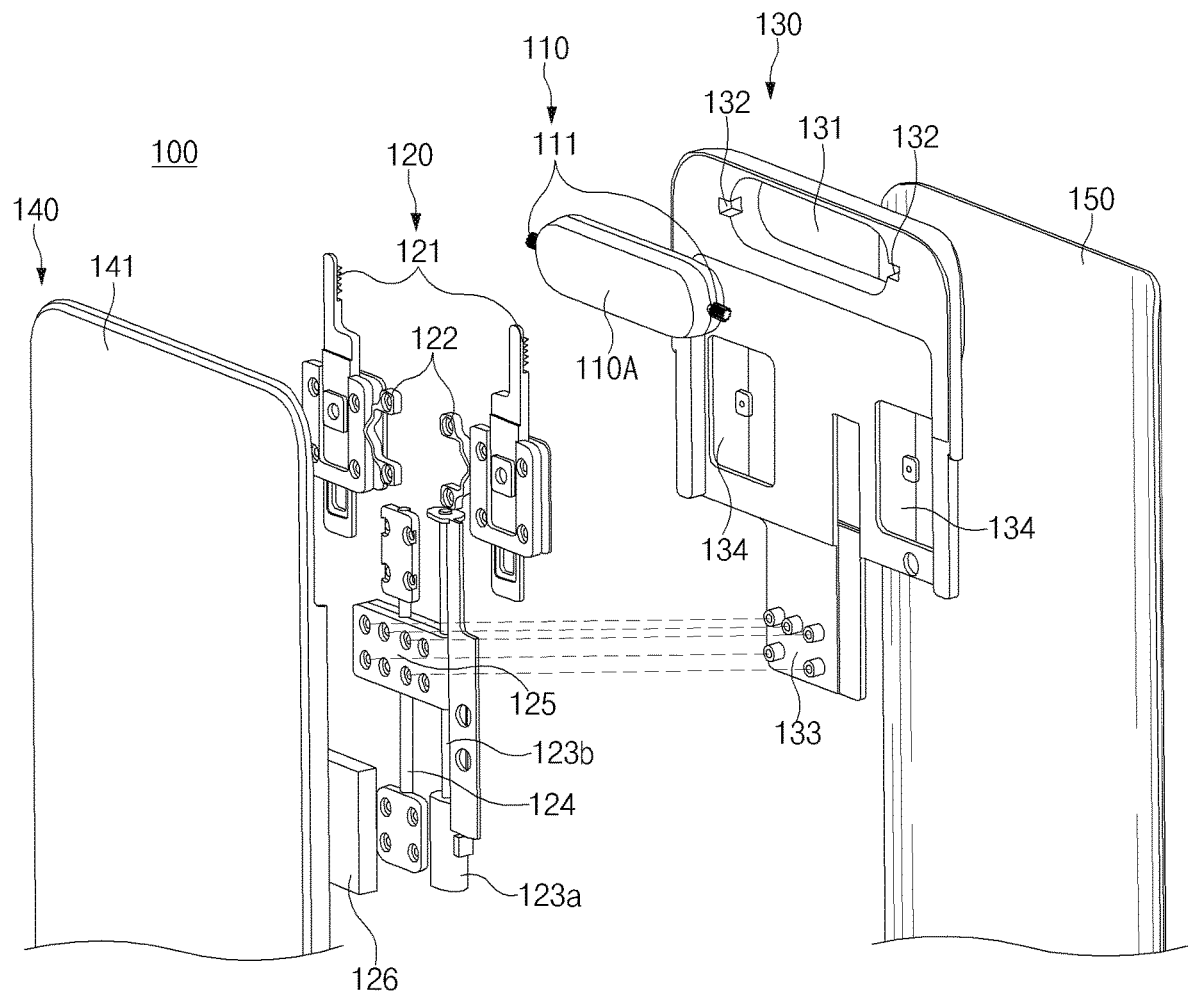
FIG. 1B is an exploded perspective view of the electronic device as viewed from a second side, according to the embodiment.

FIG. 1A is an exploded perspective view of an electronic device as viewed from a first side, according to an embodiment of the disclosure. FIG. 1B is an exploded perspective view of the electronic device as viewed from a second side, according to the embodiment of the disclosure.

Referring to FIGS. 1A and 1B, the electronic device 100 includes a camera module 110, a sliding movement control part 120, a sliding part 130, a screen part 140, and a back cover 150. The electronic device 100 may further include one or more additional components.

The electronic device 100 may include a housing that contains the camera module 110, the sliding movement control part 120, the sliding part 130, the screen part 140, and the back cover 150. The housing may refer to a structure that forms the exterior of the electronic device 100. Alternatively, the housing may include an internal structure of the electronic device 100.

The camera module 110 may include a first camera device 112, a second camera device 113, a third camera device 116, a flash 114, or a sensor module 115. The first camera device 112, the second camera device 113, and the third camera device 116 may include one or more lenses, an image sensor, and/or an image signal processor. The flash 114 may include a light emitting diode or a xenon lamp. The sensor module 115 may generate an electrical signal or a data value that corresponds to an operational state inside the electronic device 100 or an environmental state outside the electronic device 100. The sensor module 115 may include a proximity sensor, an illuminance sensor, and a heart rate monitor (HRM) sensor.

The electronic device 100 may further include a sensor module, which may be at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or a fingerprint sensor.

The camera module 110 may include a camera housing 110A that contains the first camera device 112, the second camera device 113, the third camera device 116, the flash 114, or the sensor module 115. The camera housing 110A may include a pinion gear 111 on at least one side surface thereof. The pinion gear 111 may be symmetrically disposed on opposite side surfaces of the camera housing 110A. The pinion gear 111 may be integrally formed with the camera housing 110A.

The sliding movement control part 120 may include a rack gear 121, a cleek 122, a motor 123a, a rotary part 123b, a guide frame 124, a movable member 125, control circuitry 126, and a control button 127. The control circuitry 126 may control the motor 123a according to a user input (e.g., an input for switching to front photography, execution of a default APP for front photography, or a click of the control button 127). The rotary part 123b may rotate according to an operation of the motor 123a. The movable member 125 may be vertically moved according to the rotation of the rotary part 123b. The movable member 125 may be coupled to a portion (e.g., a movable member coupling part 133) of the sliding part 130. The sliding part 130 may be moved according to the movement of the movable member 125. The cleek 122, the motor 123a, and the guide frame 124 may be coupled to a portion of the housing (e.g., a rear surface of the screen part 140 or a rear surface of a display 141).

The rack gear 121 may move in response to the movement of the sliding part 130. For example, the rack gear 121 may move a first specific distance and may thereafter be fixed by the cleek 122. After the rack gear 121 is fixed by the cleek 122, the sliding part 130 may further move a second specific distance.

The pinion gear 111 of the camera module 110 may be engaged with the rack gear 121 of the sliding movement control part 120. For example, the rack gear 121, the camera module 110, and the sliding part 130 may move together in the vertical direction (e.g., upward or downward) by the first specific distance. During the movement of the sliding part 130 over the second specific distance after the rack gear 121 is fixed by the cleek 122, the pinion gear 111 may rotate on the rack gear 121, and the camera module 110 may rotate in an opening 131.

The pinion gear 111 may rotate based on the length (or the number of gear teeth) of the rack gear 121. For example, the angle through which the pinion gear 111 rotates may vary depending on the length (or the number of gear teeth) of the rack gear 121. Accordingly, depending on the length (or the number of gear teeth) of the rack gear 121, the camera module 110 coupled with the pinion gear 111 may rotate by a predetermined angle (e.g., 10 degrees to 270 degrees with respect to a rear surface of the electronic device 100). For example, the length (or the number of gear teeth) of the rack gear 121 may be set such that the pinion gear 111 rotates by 180 degrees. Additionally, the length (or the number of gear teeth) of the rack gear 121 may be set such that the pinion gear 111 rotates by 180 degrees or less (an angle of 0 degrees to 180 degrees). Alternatively, the length (or the number of gear teeth) of the rack gear 121 may be set such that the pinion gear 111 rotates by 180 degrees or more (an angle of 180 degrees to 300 degrees). When the pinion gear 111 rotates by 180 degrees or more, the camera module 110 may rotate to an angle more appropriate for taking a selfie.

The sliding part 130 may include the opening 131, a gear recess 132, and the movable member coupling part 133. For example, the opening 131 may be formed in a portion of the sliding part 130 (e.g., on an upper side of the sliding part 130). The opening 131 may be formed to correspond to the size of the camera module 110. The camera module 110 may be disposed in the opening 131. The camera module 110 may rotate in the opening 131 about the pinion gear 111. The pinion gear 111 may be disposed in the gear recess 132. The pinion gear 111 may rotate in the gear recess 132. The movable member coupling part 133 may be coupled to the movable member 125. Accordingly, the sliding part 130 may move according to a movement (e.g., a vertical movement) of the movable member 125.

The sliding part 130 may include a gear guide recess 134 disposed to correspond to the gear guide recess 134. The distance by which the rack gear 121 moves may be determined by the gear guide recess 134.

The screen part 140 may include the display 141 combined with, or disposed adjacent to, touch detection circuitry, a pressure sensor for measuring the intensity (pressure) of a touch, and/or a digitizer for detecting a stylus pen of a magnetic type device. At least part of a sensor module (e.g., the sensor module 976 of FIG. 9 that will be described below) and/or at least part of a key input device (e.g., the input device 950 of FIG. 9 that will be described below) may be disposed on a portion of the display 141. The display 141 may be implemented in a maximum area on a front surface of the electronic device 100 (e.g., on the entire front surface of the screen part 140) because no camera is disposed on the front surface (i.e., the camera is in a retracted position with respect to the front surface).

The back cover 150 may cover a portion of the sliding part 130. For example, the opening 131 may be formed in a portion of the sliding part 130 (e.g., on an upper side of the sliding part 130) that is not hidden by the back cover 150. The sliding part 130 may vertically move between the screen part 140 and the back cover 150. The back cover 150 may be formed of, for example, coated or colored glass, ceramic, polymer, metal (e.g., aluminum, stainless steel (STS), or magnesium), or a combination of at least two thereof.

The electronic device 100 may include an audio module (e.g., the audio module 970 of FIG. 9 that will be described below). The audio module may include a microphone hole and a speaker hole. A microphone for obtaining a sound from the outside may be disposed in the microphone hole, and a plurality of microphones may be disposed in the microphone hole to sense the direction of a sound. The speaker hole may include an external speaker hole and a receiver hole for a telephone call. The speaker hole and the microphone hole may be implemented as a single hole, or a speaker (e.g., a piezoelectric speaker) may be included without the speaker hole.

The electronic device 100 may include a key input device (e.g., the input device 950 of FIG. 9 that will be described below). For example, the key input device may include a home key button disposed on the front surface of the electronic device 100, a touch pad disposed around the home key button, and/or a side key button 127 disposed on a side surface of the electronic device 100. The electronic device 100 may not include all or some of the aforementioned key input devices, and the key input devices not included may be implemented in different forms such as soft keys or buttons on the display 141.

The electronic device 100 may include a connector hole that may include a first connector hole in which a connector (e.g., a universal serial bus (USB) connector) for transmitting and receiving power and/or data with an external electronic device is received, and/or a second connector hole (e.g., an earphone jack) in which a connector for transmitting and receiving audio signals with an external electronic device is received.

The electronic device 100 may include a printed circuit board between the screen part 140 and the back cover 150. A processor (e.g., the processor 920 of FIG. 9 that will be described below), a memory (e.g., the memory 930 of FIG. 9 that will be described below), and/or an interface (e.g., the interface 977 of FIG. 9 that will be described below) may be mounted on the printed circuit board. The processor may include one or more of, for example, a central processing unit, an application processor, a graphic processing unit, an image signal processor, a sensor hub processor, or a communication processor.

Figure 2A:
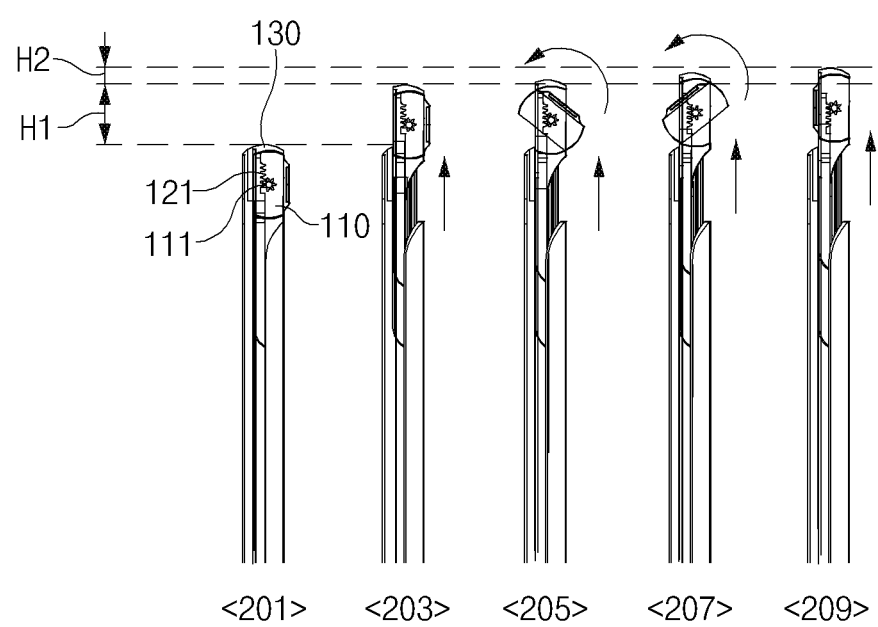
FIG. 2A is a side view illustrating an upward movement of a camera module, according to an embodiment.

FIG. 2A is a side view illustrating an upward movement of the camera module, according to an embodiment of the disclosure.

Referring to FIG. 2A, the camera module 110 performs an upward movement or a rotational motion based on a user input (e.g., an input for switching to front photography or execution of a default APP for front photography). At least one camera included in the camera module 110 may be used as a front camera (e.g., a selfie camera) according to a rotation of the camera module 110.

In state 201, a camera included in the camera module 110 faces the rear of the electronic device 100. At this time, the camera included in the camera module 110 may be used as a rear camera.

In state 203, the camera module 110, the rack gear 121, and the sliding part 130 move upward based on a user input. For example, the camera module 110, the rack gear 121, and the sliding part 130 may move a first movement distance H1. In state 203, the rack gear 121 may be fixed by a cleek 122.

In states 205, 207, and 209, the camera module 110 performs an upward movement and a rotational motion. For example, in states 205, 207, and 209, the rack gear 121 may be fixed by the cleek, and only the camera module 110 and the sliding part 130 may move upward. The camera module 110 and the sliding part 130 may move upward by a second movement distance H2. The pinion gear 111 engaged with the rack gear 121 may rotate, and the camera module 110 may rotate. In state 209, the camera included in the camera module 110 faces the front of the electronic device 100. At this time, the camera included in the camera module 110 may be used as a front camera.

The pinion gear 111 may rotate based on the length (or the number of gear teeth) of the rack gear 121. For example, the angle through which the pinion gear 111 rotates may vary depending on the length (or the number of gear teeth) of the rack gear 121. Accordingly, depending on the length (or the number of gear teeth) of the rack gear 121, the camera module 110 coupled with the pinion gear 111 may rotate by a predetermined angle (e.g., 1 degree to 300 degrees with respect to the rear surface of the electronic device 100). For example, the length (or the number of gear teeth) of the rack gear 121 may be set such that the pinion gear 111 rotates by 180 degrees, or the length (or the number of gear teeth) of the rack gear 121 may be set such that the pinion gear 111 rotates by 180 degrees or less (an angle of 1 degree to 180 degrees). Alternatively, the length (or the number of gear teeth) of the rack gear 121 may be set such that the pinion gear 111 rotates by 180 degrees or more (an angle of 180 degrees to 300 degrees). When the pinion gear 111 rotates by 180 degrees or more, the camera module 110 may rotate to an angle more appropriate for taking a selfie.

Figure 2B:
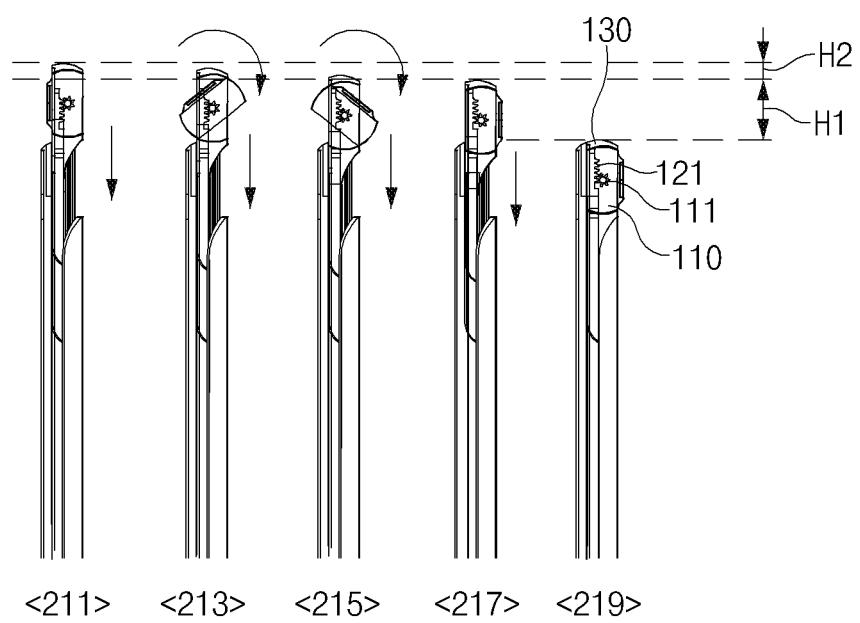
FIG. 2B is a side view illustrating a downward movement of the camera module, according to an embodiment.
Figure 3A:
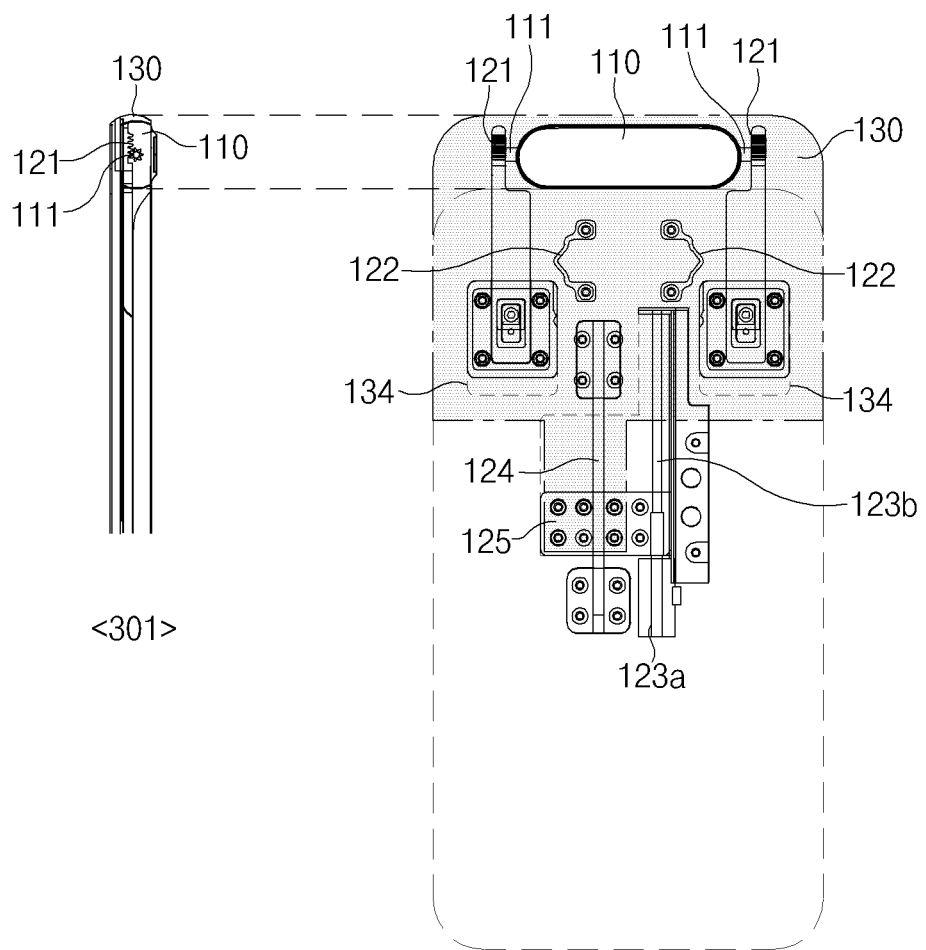
FIG. 3A is a perspective view illustrating a first partial action of an upward movement of the camera module, according to an embodiment.
Figure 3B:
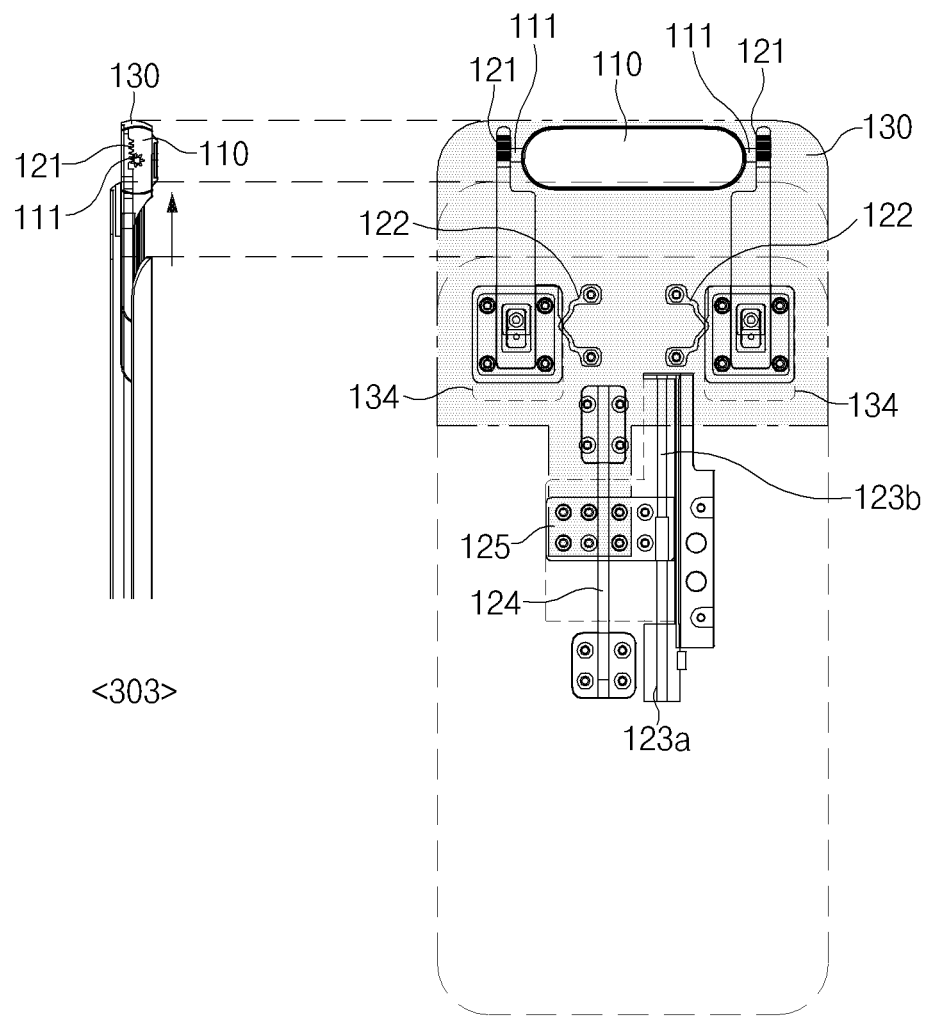
FIG. 3B is a perspective view illustrating a second partial action of the upward movement of the camera module, according to an embodiment.
Figure 3C:
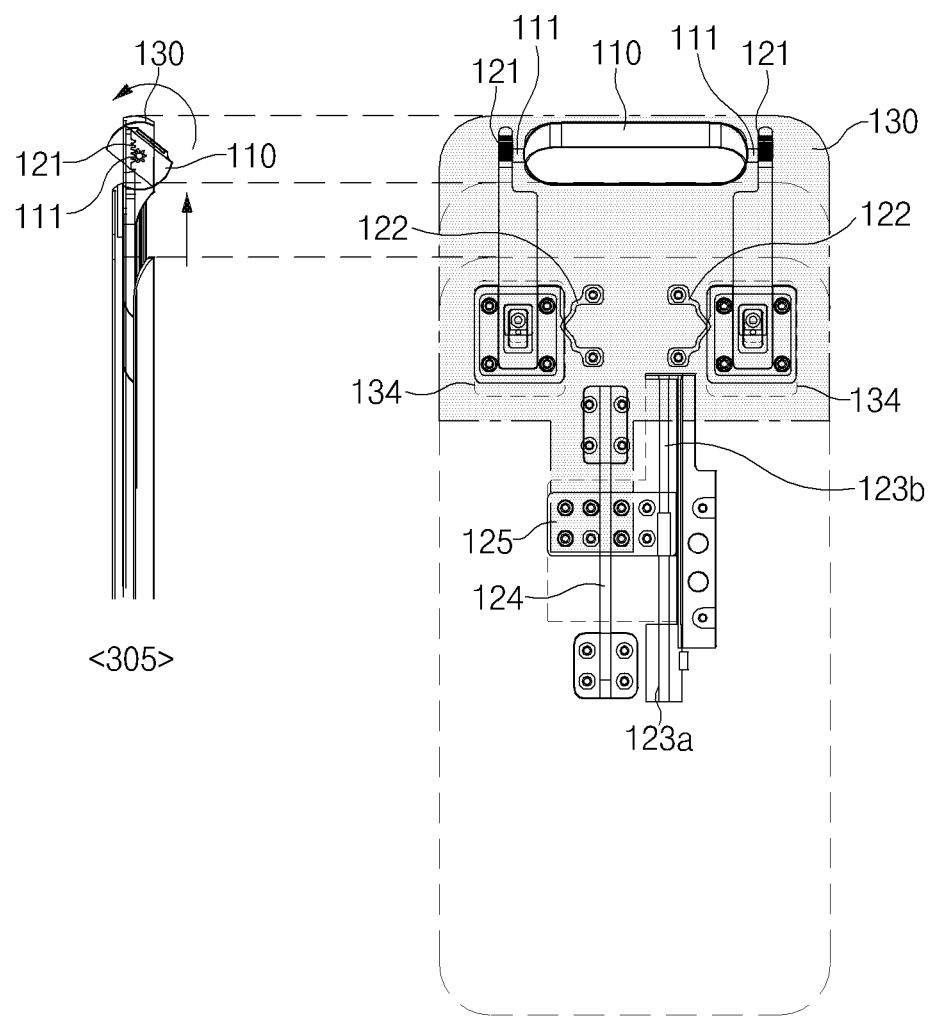
FIG. 3C is a perspective view illustrating a third partial action of the upward movement of the camera module, according to an embodiment.
Figure 3D:
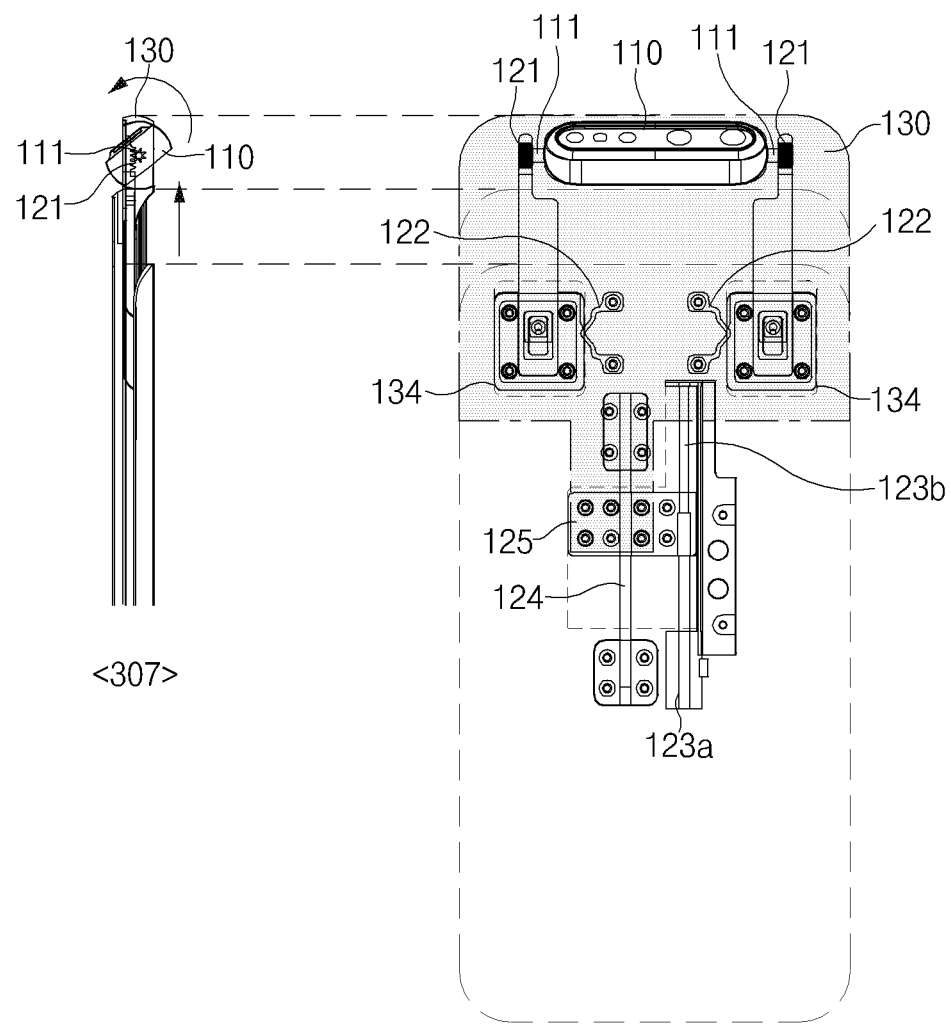
FIG. 3D is a perspective view illustrating a fourth partial action of the upward movement of the camera module, according to an embodiment.
Figure 3E:
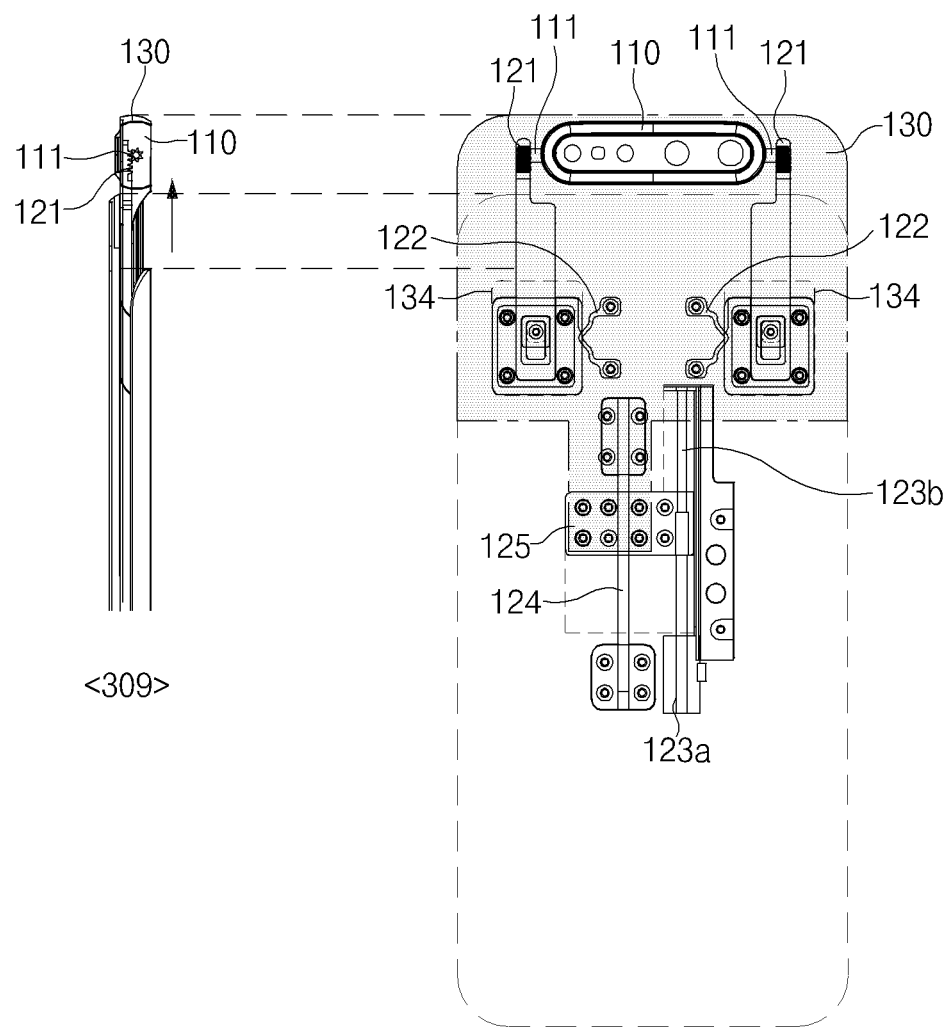
FIG. 3E is a perspective view illustrating a fifth partial action of the upward movement of the camera module, according to an embodiment.
Figure 4A:
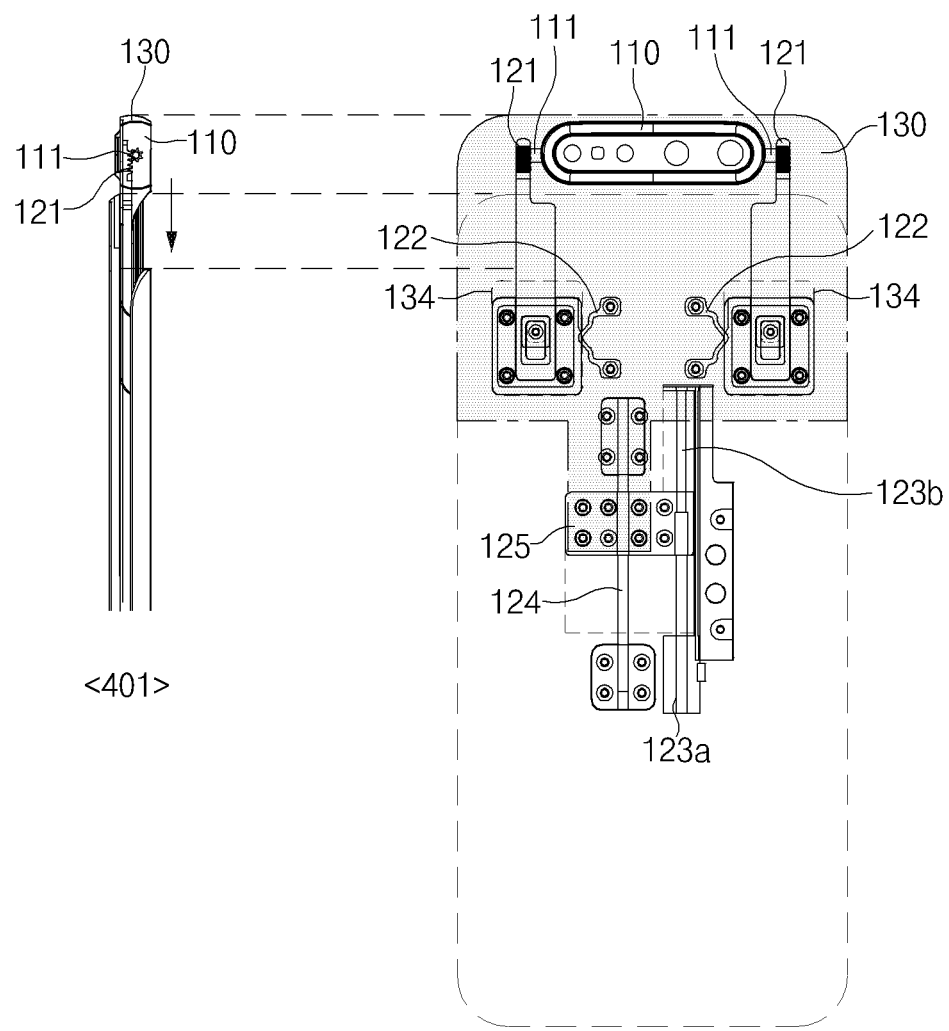
FIG. 4A is a perspective view illustrating a first partial action of a downward movement of the camera module, according to an embodiment.
Figure 4B:
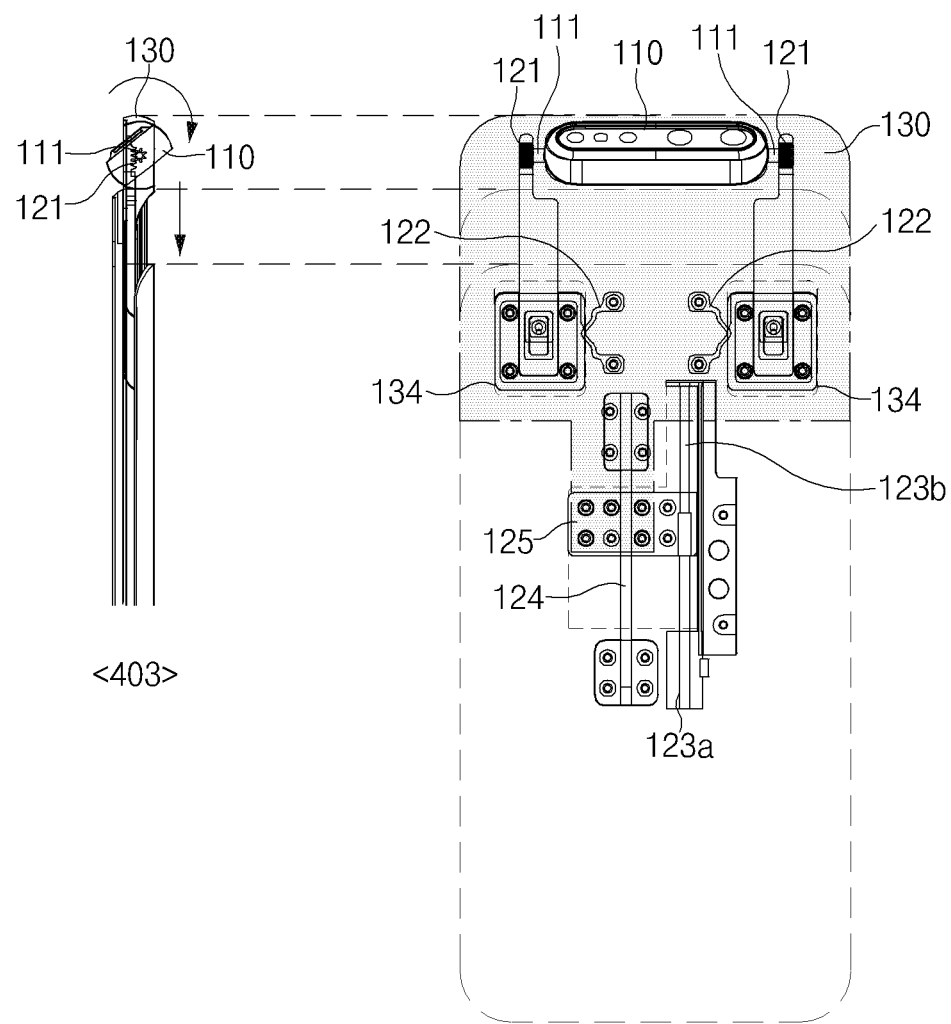
FIG. 4B is a perspective view illustrating a second partial action of the downward movement of the camera module, according to an embodiment.
Figure 4C:
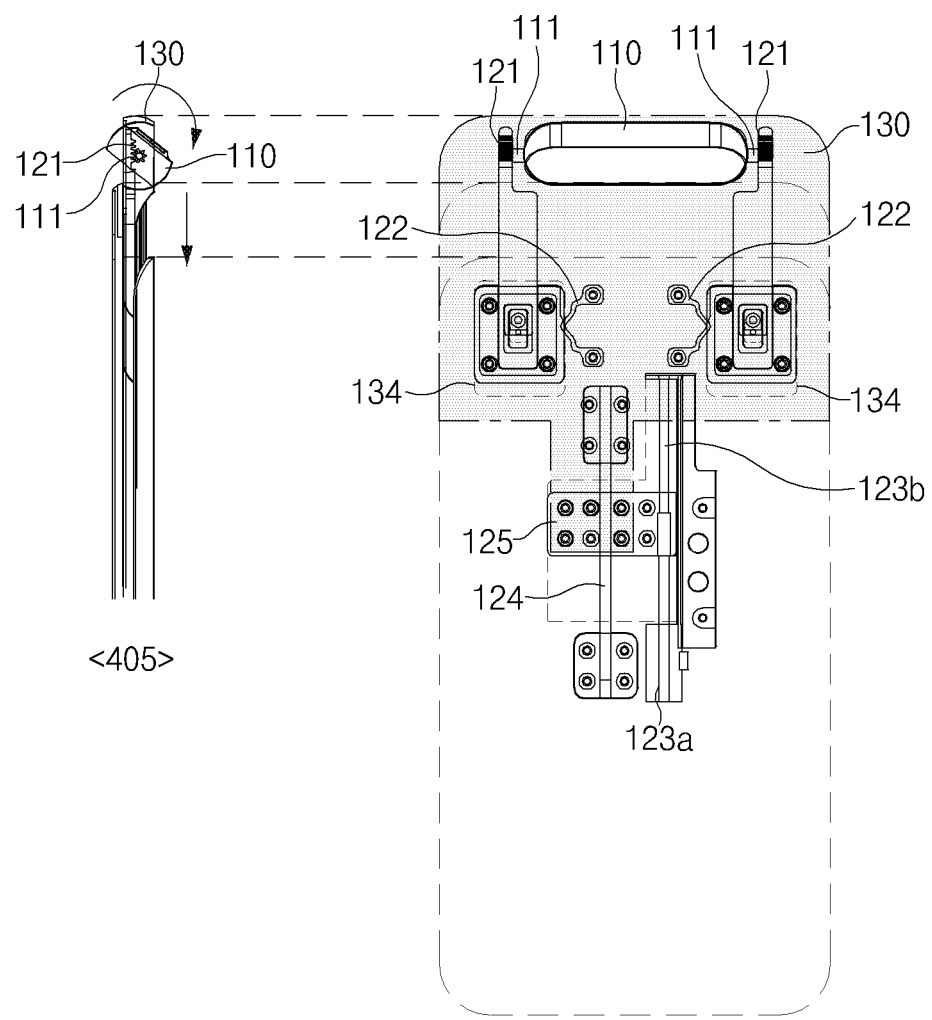
FIG. 4C is a perspective view illustrating a third partial action of the downward movement of the camera module, according to an embodiment.
Figure 4D:
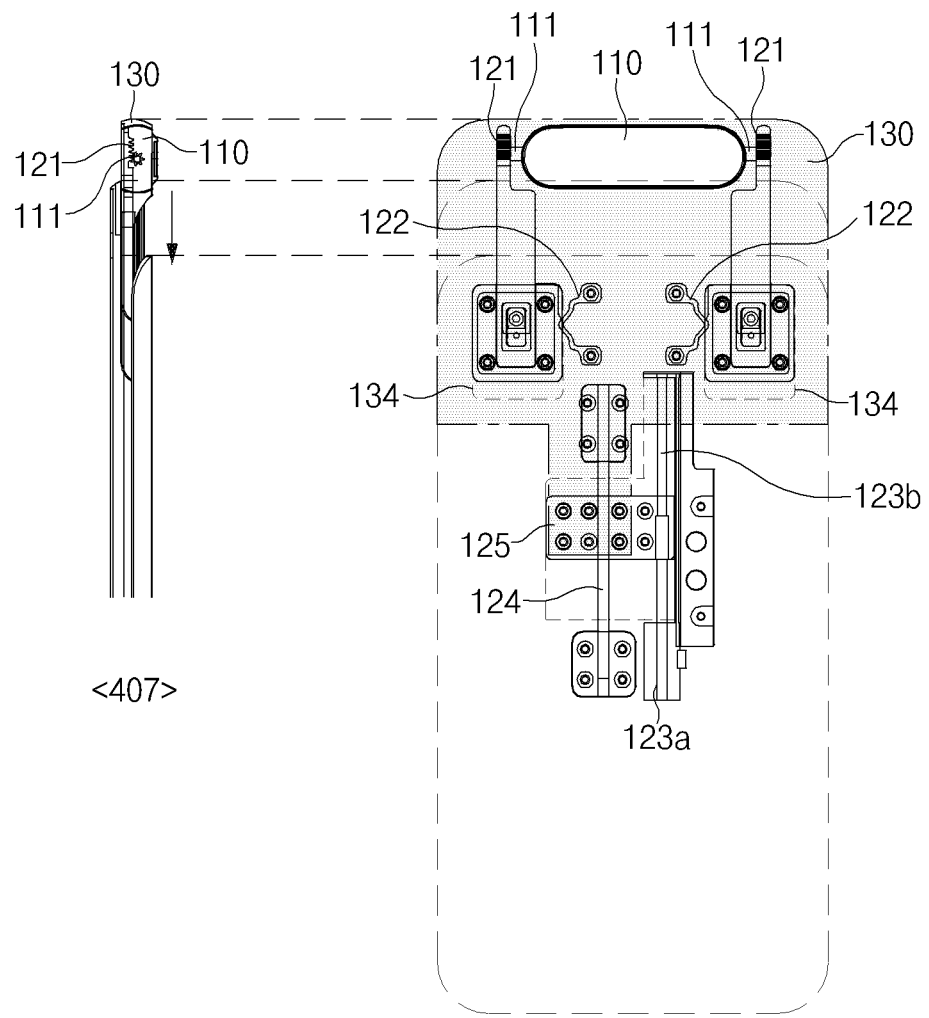
FIG. 4D is a perspective view illustrating a fourth partial action of the downward movement of the camera module, according to an embodiment.
Figure 4E:
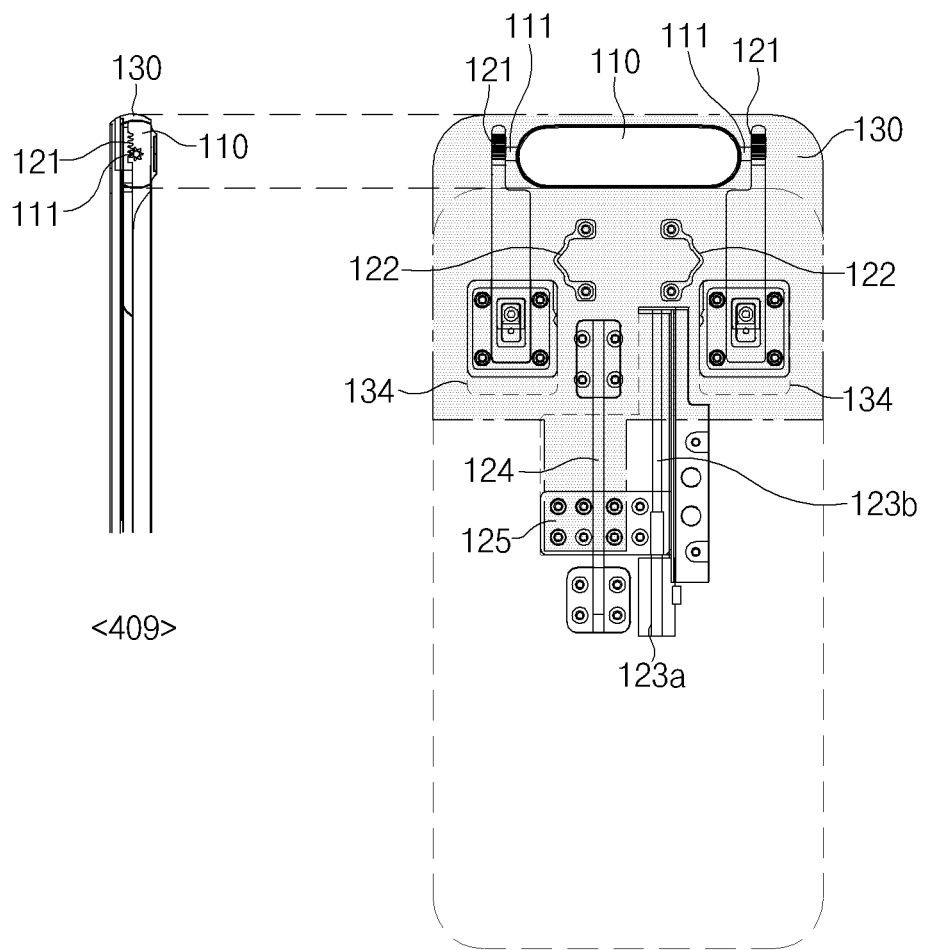
FIG. 4E is a perspective view illustrating a fifth partial action of the downward movement of the camera module, according to an embodiment.

FIG. 2B is a side view illustrating a downward movement of the camera module, according to an embodiment of the disclosure.

Referring to FIG. 2B, the camera module 110 performs a downward movement or a rotational motion based on a user input (e.g., an input for switching to back photography or an input for ending photography). At least one camera included in the camera module 110 may be used as a rear camera according to a rotation of the camera module 110.

In state 211, a camera included in the camera module 110 faces the front of the electronic device 100. The camera included in the camera module 110 may face the front of the electronic device 100 according to a previously entered user input (e.g., an input for switching to front photography or execution of a default APP for front photography). The camera module 110 may face the front of the electronic device 100 at a specific angle (e.g., 1 degree to 300 degrees with respect to the rear surface of the electronic device 100) depending on the gear ratio between the pinion gear 111 and the rack gear 121.

In states 211, 213, and 215, the camera module 110 performs a downward movement and a rotational motion. In states 211, 213, and 215, the rack gear 121 may remain fixed by the cleek 122, and only the camera module 110 and the sliding part 130 may move downward. The camera module 110 and the sliding part 130 may move downward by the second movement distance H2. The pinion gear 111 engaged with the rack gear 121 may rotate, thereby rotating the camera module 110.

In state 217, the camera included in the camera module 110 faces the rear of the electronic device 100. In state 217, the camera module 110, the rack gear 121, and the sliding part 130 may perform a downward movement together. At this time, the rack gear 121 may be released from the cleek 122. The camera module 110, the rack gear 121, and the sliding part 130 may move the first movement distance H1. In state 219, the camera module 110 may return to the original position (e.g., state 201).

FIGS. 3A to 3E are perspective views illustrating an upward movement of the camera module, according to various embodiments of the disclosure. Accordingly, states 301, 303, 305, 307, and 309 of FIGS. 3A to 3E are perspective views which may respectively correspond to the side views illustrated by states 201, 203, 205, 207, and 209 of FIG. 2A.

Referring to FIGS. 3A to 3E, the camera module 110 performs an upward movement or a rotational motion based on a user input (e.g., an input for switching to front photography or execution of a default APP for front photography). At least one camera included in the camera module 110 may be used as a front camera (e.g., a selfie camera) according to a rotation of the camera module 110.

In state 301, a camera included in the camera module 110 faces the rear of the electronic device 100. At this time, the camera included in the camera module 110 may be used as a rear camera. The movable member 125 may be located at a reference position (e.g., at the lowermost end of the guide frame 124).

In state 303, the camera module 110, the rack gear 121, and the sliding part 130 perform an upward movement based on a user input. The motor 123a may operate under the control of control circuitry 126, and the rotary part 123b may be rotated in a first rotating direction by the motor 123a. The movable member 125 may move upward according to the rotation of the rotary part 123b. The sliding part 130 coupled to the movable member 125 may move upward, and the rack gear 121 and the camera module 110, which are connected to the sliding part 130, may move upward together. The camera module 110, the rack gear 121, and the sliding part 130 may move a first movement distance H1. In state 303, the rack gear 121 may be fixed by the cleek 122.

In states 305, 307, and 309, the camera module 110 performs an upward movement and a rotational motion. In states 305, 307, and 309, the rack gear 121 may be fixed by the cleek 122, and only the camera module 110 and the sliding part 130 may move upward. The camera module 110 and the sliding part 130 may move upward by a second movement distance H2. The pinion gear 111 engaged with the rack gear 121 may rotate, thereby rotating the camera module 110 may rotate.

In state 309, the camera included in the camera module 110 faces the front of the electronic device 100. The movable member 125 may be located at the uppermost end of the guide frame 124. At this time, the camera included in the camera module 110 may be used as a front camera.

The pinion gear 111 may rotate based on the length (or the number of gear teeth) of the rack gear 121. For example, the angle through which the pinion gear 111 rotates may vary depending on the length (or the number of gear teeth) of the rack gear 121. Accordingly, depending on the length (or the number of gear teeth) of the rack gear 121, the camera module 110 coupled with the pinion gear 111 may rotate by a predetermined angle (e.g., 1 degree to 300 degrees with respect to the rear surface of the electronic device 100). For example, the length (or the number of gear teeth) of the rack gear 121 may be set such that the pinion gear 111 rotates by 180 degrees. The length (or the number of gear teeth) of the rack gear 121 may be set such that the pinion gear 111 rotates by 180 degrees or less (an angle of 1 degree to 180 degrees). Alternatively, the length (or the number of gear teeth) of the rack gear 121 may be set such that the pinion gear 111 rotates by 180 degrees or more (an angle of 180 degrees to 300 degrees). When the pinion gear 111 rotates by 180 degrees or more, the camera module 110 may rotate to an angle more appropriate for taking a selfie.

FIGS. 4A to 4E are perspective views illustrating a downward movement of the camera module, according to various embodiments of the disclosure. Accordingly, states 401, 403, 405, 407, and 409 of FIGS. 4A to 4E are perspective views which may respectively correspond to the side views illustrated by states 211, 213, 215, 217, and 219 of FIG. 2B.

Referring to FIGS. 4A to 4E, the camera module 110 performs a downward movement or a rotational motion based on a user input (e.g., an input for switching to back photography or an input for ending photography). At least one camera included in the camera module 110 may be used as a rear camera according to a rotation of the camera module 110.

In state 401, a camera included in the camera module 110 faces the front of the electronic device 100. The camera included in the camera module 110 may face the front of the electronic device 100 according to a previously entered user input (e.g., an input for switching to front photography or execution of a default APP for front photography). The motor 123a may operate under the control of control circuitry 126, and the rotary part 123b may be rotated in a second rotating direction opposite to the first rotating direction by the motor 123a. The movable member 125 may move downward according to the rotation of the rotary part 123b. The sliding part 130 coupled to the movable member 125 may move downward, and the camera module 110 connected to the sliding part 130 may move downward. The camera module 110 and the sliding part 130 may move the second movement distance H2. At this time, the rack gear 121 fixed by the cleek 122 does not move downward.

In states 403, 405, and 407, the camera module 110 performs a downward movement and a rotational motion. In states 403, 405, and 407, the rack gear 121 may remain fixed by the cleek 122, and only the camera module 110 and the sliding part 130 may move downward. The camera module 110 and the sliding part 130 may move downward by the second movement distance H2. The pinion gear 111 engaged with the rack gear 121 may rotate, thereby rotating the camera module 110.

In state 407, the camera included in the camera module 110 faces the rear of the electronic device 100. In state 407, the camera module 110, the rack gear 121, and the sliding part 130 may perform a downward movement together. At this time, the rack gear 121 may be released from the cleek 122. The camera module 110, the rack gear 121, and the sliding part 130 may move the first movement distance H1. In state 409, the camera module 110 returns to the original position (e.g., state 301). In state 409, the movable member 125 may be located at the lowermost end of the guide frame 124.

Figure 5:
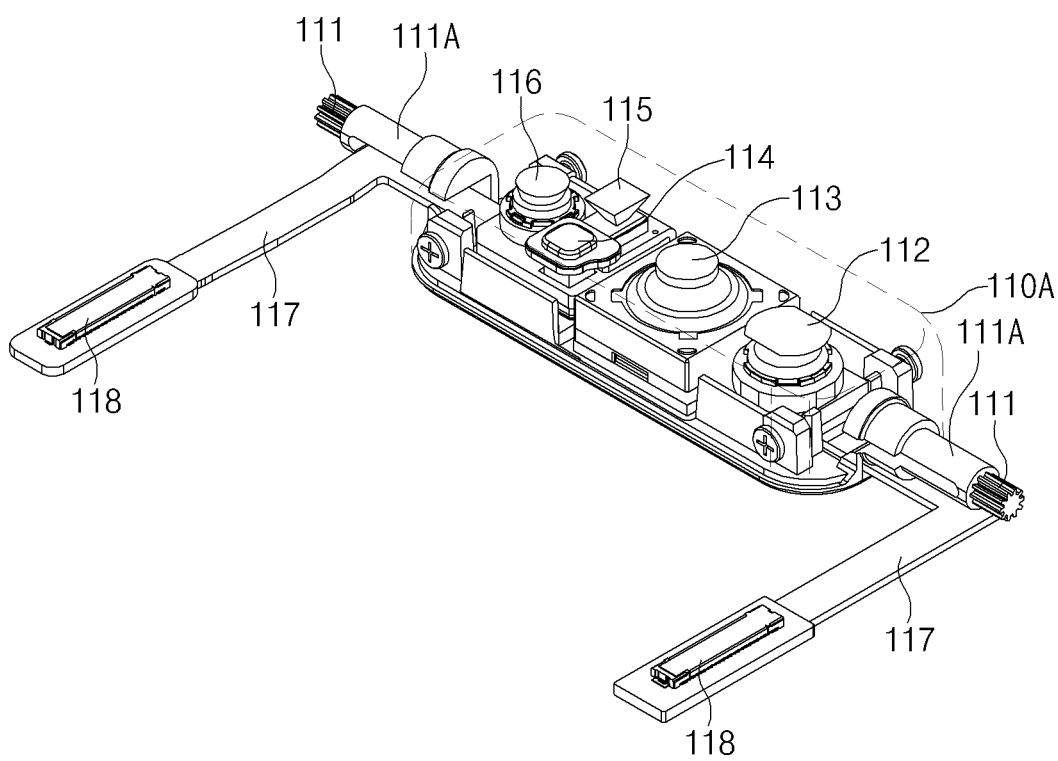
FIG. 5 is a view illustrating an example of the structure of the camera module, according to an embodiment.

FIG. 5 is a view illustrating an example of the structure of the camera module, according to an embodiment of the disclosure.

Referring to FIG. 5, the camera module 110 includes the first camera device 112, the second camera device 113, the third camera device 116, the flash 114, or the sensor module 115. The first camera device 112, the second camera device 113, and the third camera device 116 may include one or more lenses, an image sensor, and/or an image signal processor. The flash 114 may include a light emitting diode or a xenon lamp. The sensor module 115 may generate an electrical signal or a data value that corresponds to an operational state inside the electronic device 100 or an environmental state outside the electronic device 100. The sensor module 115 may include, for example, a proximity sensor, an illuminance sensor, and an HRM sensor.

The camera module 110 may include a flexible printed circuit board 117 and a connecting terminal 118. For example, the camera module 110 may be connected with a printed circuit board in an electronic device 100 through the flexible printed circuit board 117. The connecting terminal 118 may be connected with a corresponding terminal on the printed circuit board in the electronic device.

The flexible printed circuit board 117 may be formed to have at least one corner. For example, the flexible printed circuit board 117 may include a first portion extending from the camera module 110 in a first direction (e.g., the axial direction of the pinion gear 111) and a second portion extending in a second direction perpendicular to the first direction.

The flexible printed circuit board 117 may be configured to be wound around an extension 111A of a rotary shaft of the pinion gear 111 as the camera module 110 rotates. For example, a portion of the flexible printed circuit board 117 may be disposed to pass through the extension 111A of the rotary shaft of the pinion gear 111. Alternatively, a portion of the flexible printed circuit board 117 may be disposed parallel to the extension 111A of the rotary shaft of the pinion gear 111. The flexible printed circuit board 117 may be disposed between the camera housing 110A and the pinion gear 111.

The camera module 110 may include the camera housing 110A that contains the first camera device 112, the second camera device 113, the third camera device 116, the flash 114, or the sensor module 115. The camera housing 110A may include the pinion gear 111 on at least one side surface thereof. The pinion gear 111 may be integrally formed with the camera housing 110A.

Figure 6A:
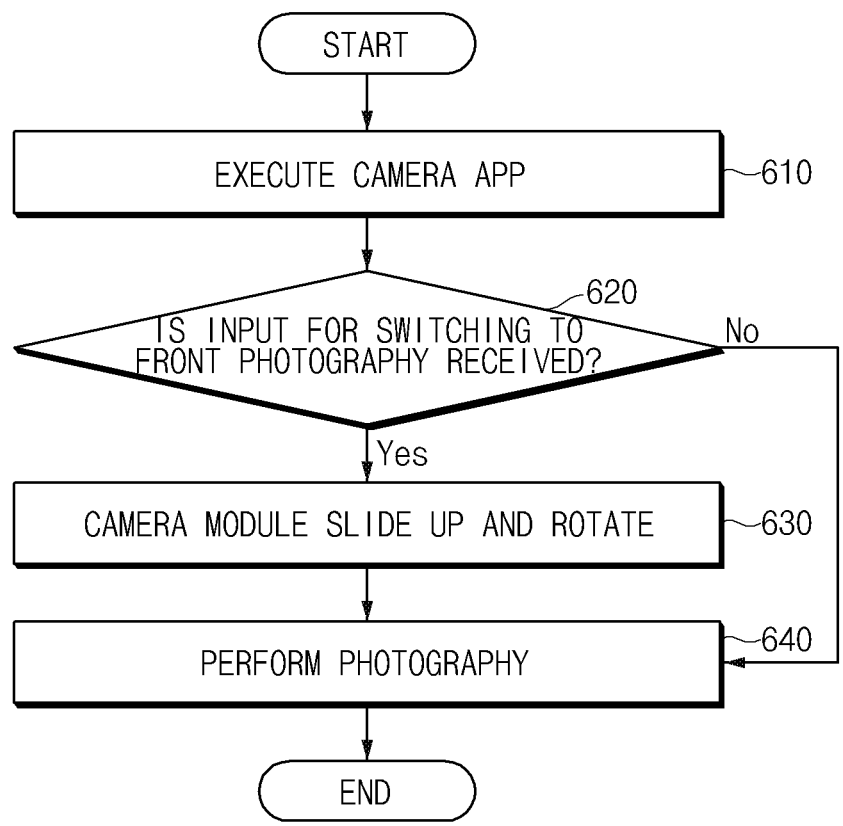
FIG. 6A is a flowchart illustrating an operating method of a camera module, according to an embodiment.
Figure 6B:
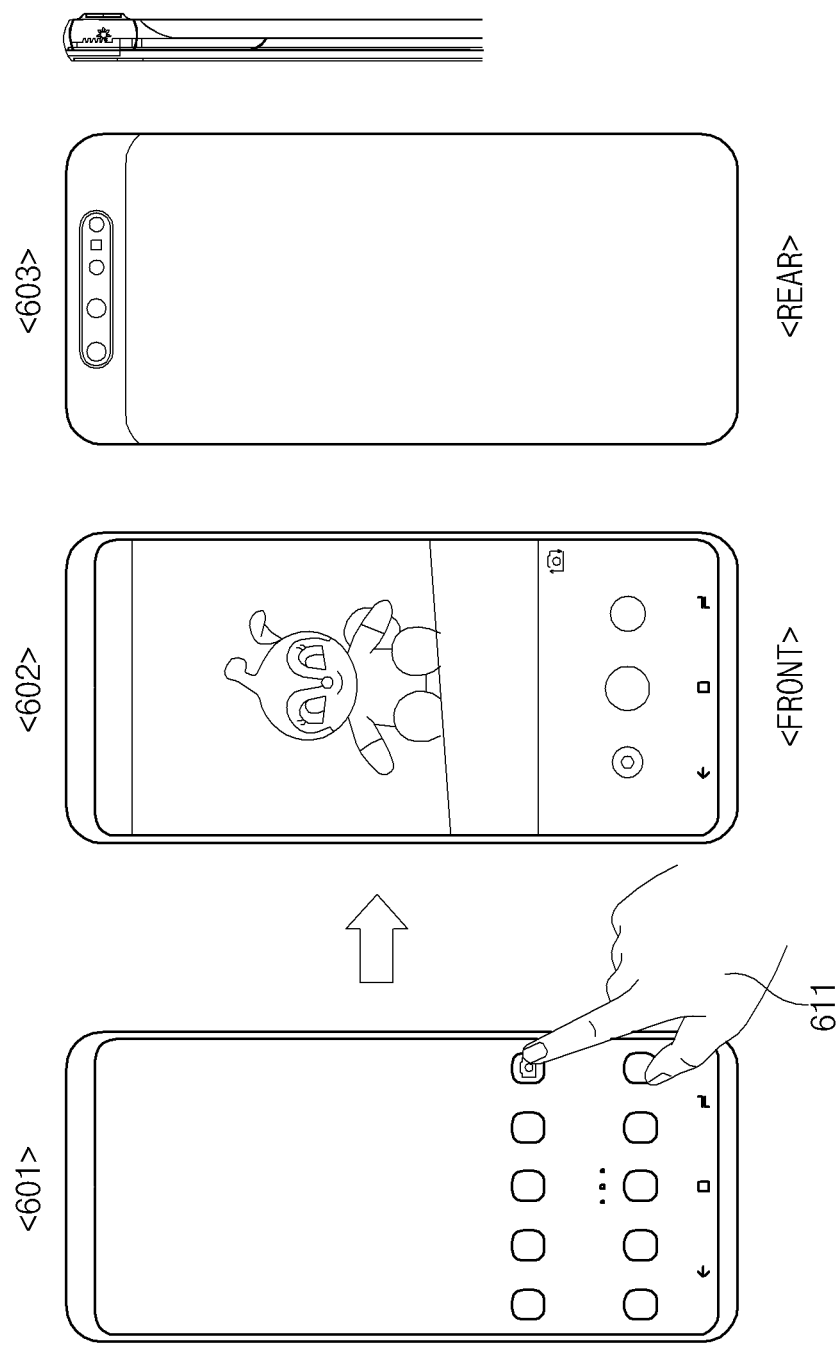
FIG. 6B is a view illustrating a default position of the camera module, according to an embodiment.
Figure 6C:
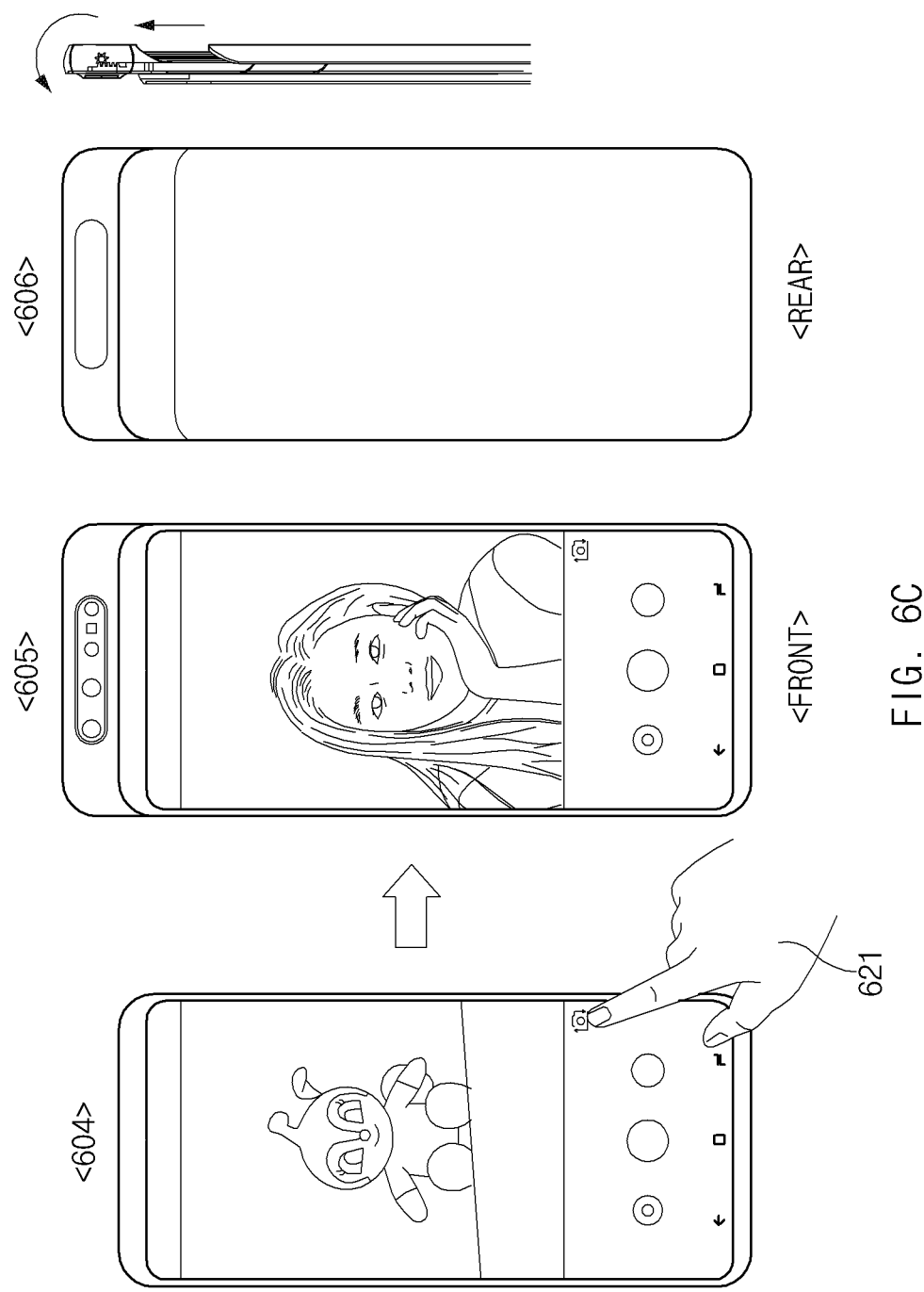
FIG. 6C is a view illustrating an operation of the camera module when an input for switching to front photography is made, according to an embodiment.

FIG. 6A is a flowchart illustrating an operating method of a camera module, according to an embodiment of the disclosure. FIG. 6B is a view illustrating a default position of the camera module, according to an embodiment of the disclosure. FIG. 6C is a view illustrating an operation of the camera module when an input for switching to front photography is made, according to an embodiment of the disclosure.

Referring to FIG. 6A, in step 610, an electronic device 100 executes a camera APP. For example, referring to FIG. 6B, the electronic device may receive a user input 611 (e.g., a touch on a camera APP icon).

In step 620, the electronic device determines whether an input for switching to front photography is received. For example, when there is no input for switching to front photography, the electronic device proceeds to step 640 to perform photography according to default settings (e.g., a rear camera). When there is an input for switching to front photography, the electronic device performs step 630.

In step 630, the electronic device raises and rotates the camera module when there is an input for switching to front photography.

In step 640, the electronic device performs photography according to current settings. For example, when the camera module faces the rear of the electronic device, the camera included in the camera module may operate as a rear camera. When the camera module faces the front of the electronic device, the camera included in the camera module may operate as a front camera.

Referring to FIG. 6B, in state 601, the electronic device displays a screen on which the camera APP icon is displayed. In state 602, the electronic device displays a camera APP screen in response to the user input 611. State 603 illustrates the rear surface of the electronic device in state 602. That is, in state 602, the camera module (e.g., the camera module 110) may basically face the rear of the electronic device when the camera APP is executed.

Referring to FIG. 6C, in state 604, the electronic device receives a user input 621 (e.g., an input for switching to front photography). In states 605 and 606, the electronic device raises and rotates the camera module. State 605 illustrates the front surface of the electronic device, and state 606 illustrates the rear surface of the electronic device. In states 605 and 606, the electronic device may switch a camera included in the camera module to a front camera.

Figure 7A:
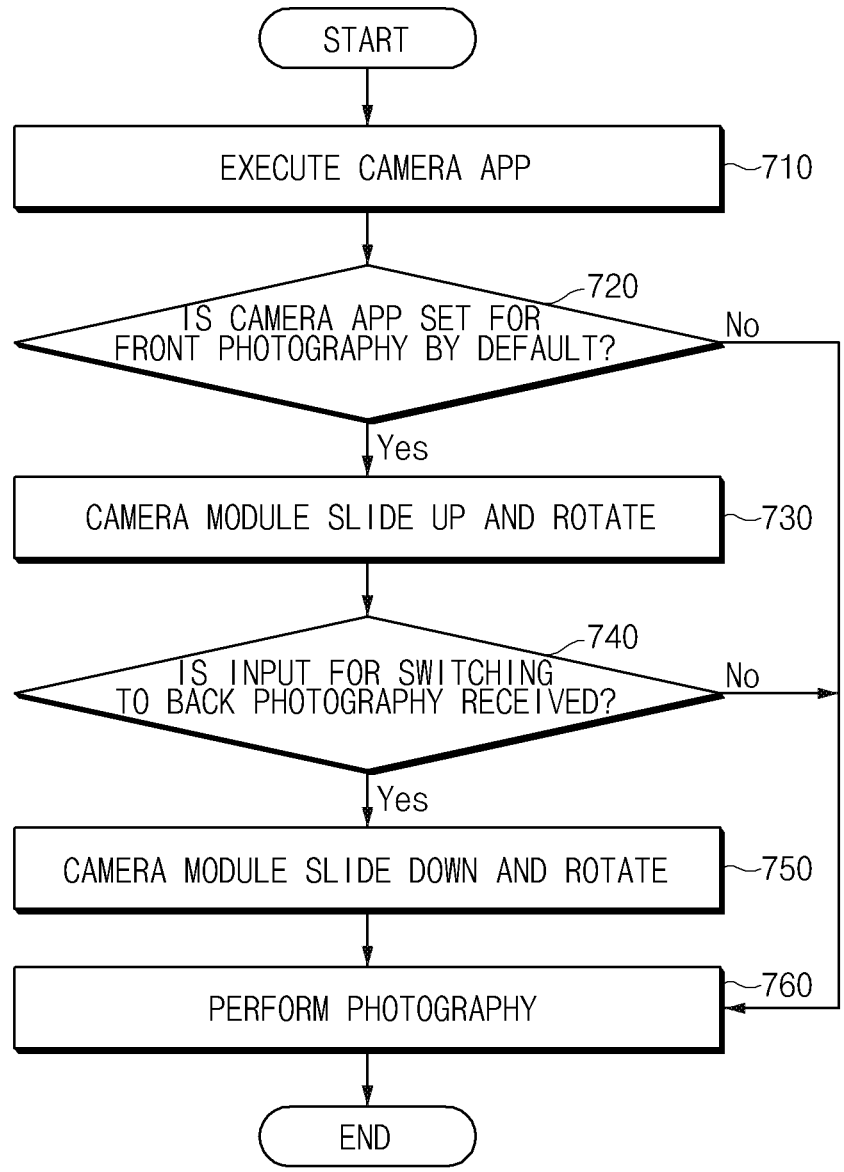
FIG. 7A is a flowchart illustrating an operating method of a camera module, according to an embodiment.
Figure 7B:
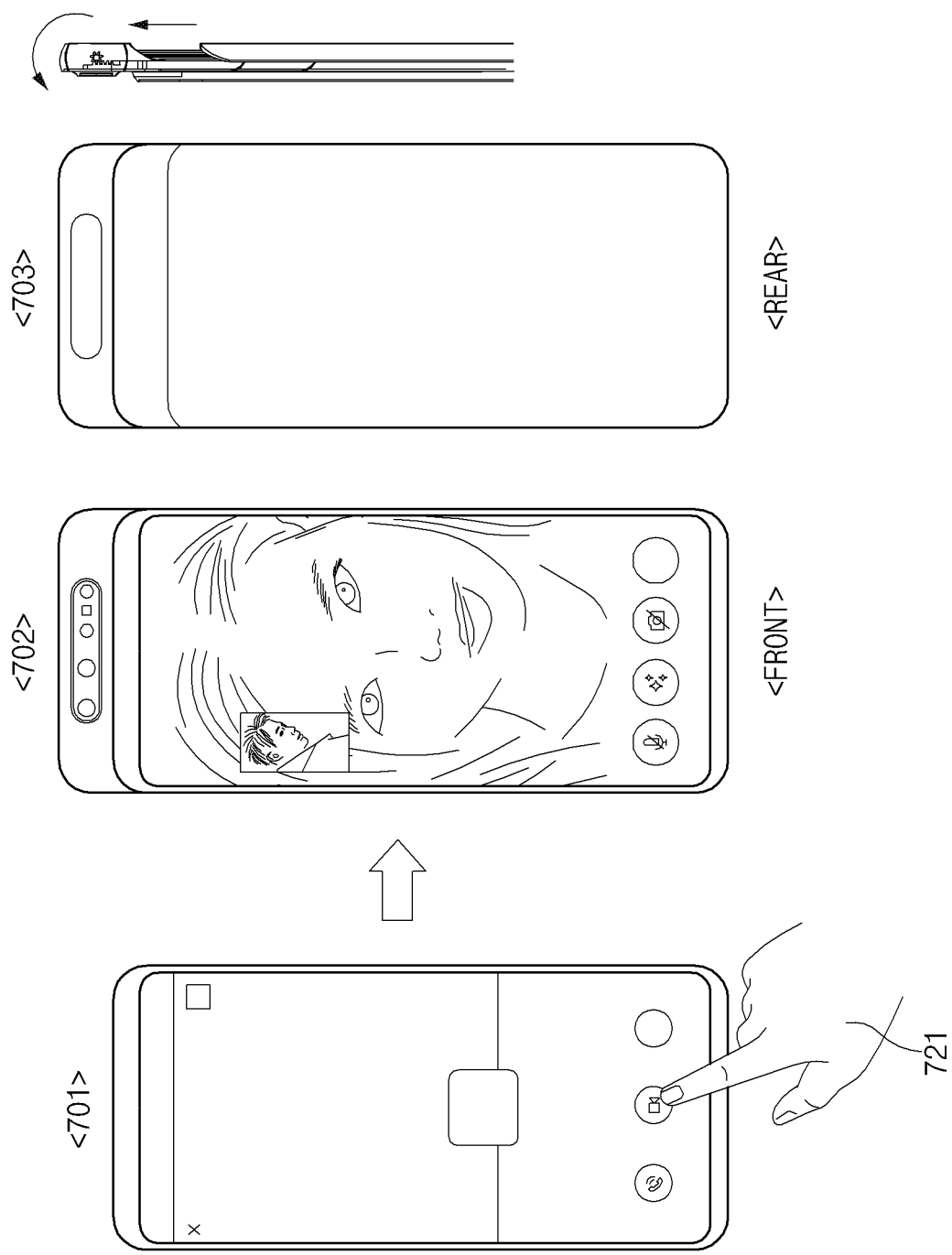
FIG. 7B is a view illustrating an operation of the camera module when an application (APP) set for front photography by default is executed, according to an embodiment.

FIG. 7A is a flowchart illustrating an operating method of a camera module, according to an embodiment of the disclosure. FIG. 7B is a view illustrating an operation of the camera module when an APP set for front photography by default is executed, according to an embodiment of the disclosure.

Referring to FIG. 7A, in step 710, an electronic device 100 executes a camera APP. As described above with reference to FIG. 6B, the electronic device may display a camera APP screen in response to the user input 611 (e.g., a touch on a camera APP icon).

In step 720, the electronic device determines whether the executed camera APP is a default APP for front photography. When the executed camera APP is not the default APP for front photography, the electronic device proceeds to step 760 to perform photography with a rear camera. When the executed camera APP is the default APP for front photography, the electronic device performs step 730.

In step 730, the electronic device raises and rotates the camera module 110. For example, referring to FIG. 7B, in state 701, the electronic device receives a user input 721 to the default APP for front photography (e.g., a video call APP). In states 702 and 703, the electronic device raises and rotates the camera module at the same time as executing the APP. State 702 illustrates the front surface of the electronic device, and state 703 illustrates the rear surface of the electronic device.

Referring again to FIG. 7A, in step 740, the electronic device determines whether a command for switching to back photography is input. When no command for switching to back photography is input, the electronic device proceeds to step 760 to maintain a front camera and perform photography. When a command for switching to back photography is input, the electronic device performs step 750.

In step 750, the electronic device lowers and rotates the camera module according to the input command for switching to back photography. The camera module may face the rear of the electronic device.

In step 760, the electronic device performs photography according to current settings. For example, when the camera module faces the rear of the electronic device, a camera included in the camera module may operate as a rear camera. When the camera module faces the front of the electronic device, the camera included in the camera module may operate as a front camera.

Figure 8A:
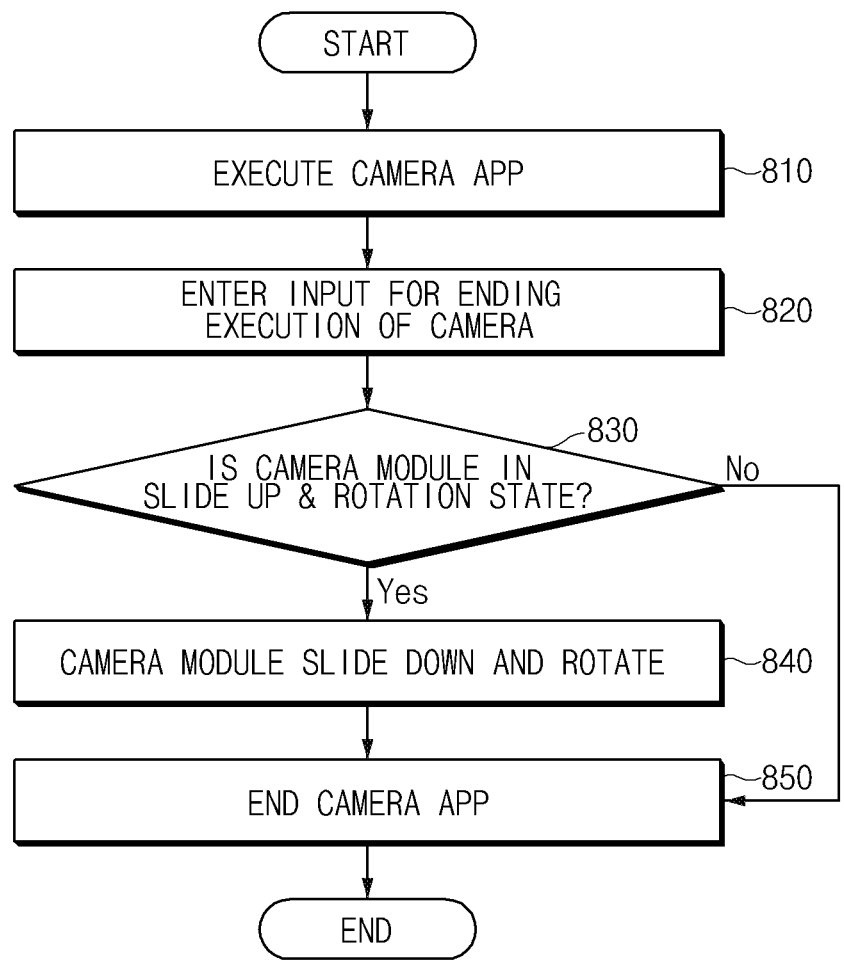
FIG. 8A is a flowchart illustrating an operating method of a camera module, according to an embodiment.
Figure 8B:
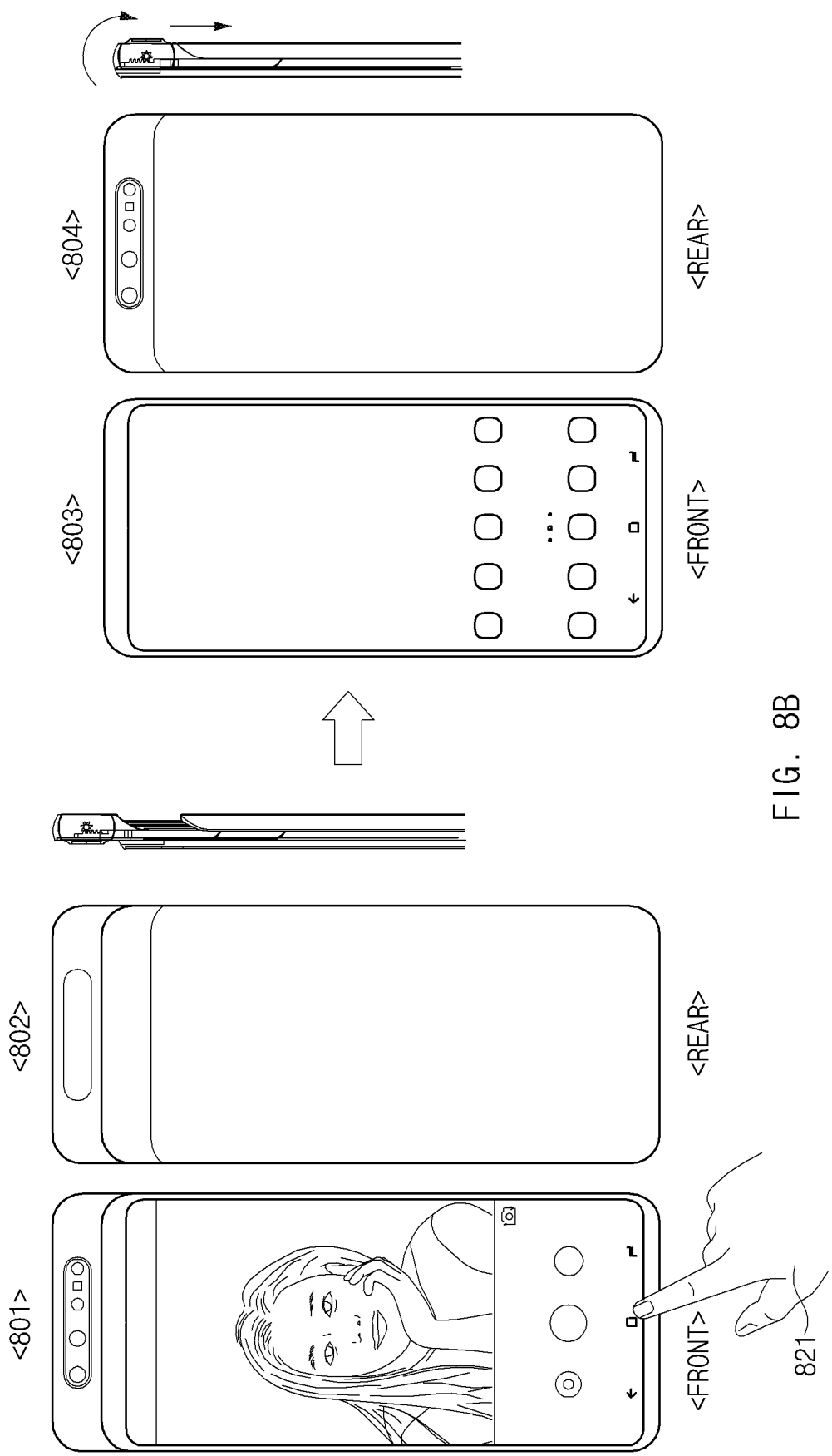
FIG. 8B is a view illustrating an operation of the camera module when an input for ending execution of a camera is made, according to an embodiment.

FIG. 8A is a flowchart illustrating an operating method of a camera module, according to an embodiment of the disclosure. FIG. 8B is a view illustrating an operation of the camera module when an input for ending execution of a camera is made, according to an embodiment of the disclosure.

Referring to FIG. 8A, in step 810, an electronic device 100 executes a camera APP. For example, the electronic device may use the camera module as a front camera or a rear camera depending on a user input.

In step 820, the electronic device receives a user input for ending execution of a camera.

In step 830, the electronic device identifies the current state of the camera module. When the camera module is located in a default position (e.g., in the position of a rear camera), the electronic device proceeds to step 850 to immediately end the camera APP. When the camera module is not located in the default position (e.g., when the camera module is located in the position of a front camera), the electronic device performs step 840.

In step 840, the electronic device lowers and rotates the camera module when the camera module is not located at the default position. For example, referring to FIG. 8B, in states 801 and 802, the camera module moves upward and operates as a front camera. State 801 illustrates the front surface of the electronic device, and state 802 illustrates the rear surface of the electronic device. In states 801 and 802, the electronic device may receive a user input 821 for ending execution of a camera. When the user input 821 for ending the execution of the camera is received, the electronic device may lower and rotate the camera module to locate the camera module at the default position (e.g., in the position of a rear camera).

Referring again to FIG. 8A, in step 850, the electronic device ends the camera APP because the camera module is located at the default position.

An electronic device 100 may include a housing, a display 141, at least part of which is received in the housing, a sliding part 130 that includes an opening 131 exposed to an outside area and that slides relative to the housing, and a camera module 110 that is disposed in the opening and that rotates relative to the sliding part. The camera module may be configured to rotate to face a first direction when the sliding part slides to a first position relative to the housing and rotate to face a second direction different from the first direction, when the sliding part slides to a second position relative to the housing.

The display may be disposed in the second direction.

An upper end of the sliding part in the first position may be aligned side by side with an upper end of the display, and the sliding part in the second position may further protrude beyond an upper portion of the housing.

The camera module may operate as a rear camera in the first position and may operate as a front camera in the second position.

The camera module may linearly move in a partial section between the first position and the second position and may perform a linear movement and rotation in the remaining section.

The electronic device may further include a guide frame 124 fixed to the housing and a movable member 125 that moves along the guide frame. A portion of the sliding part may be coupled with the movable member.

The electronic device may further include a motor 123*a* and a rotary part 123*b* that is rotated by the motor. The movable member may perform a linearly reciprocating motion along the guide frame by a rotation of the rotary part.

The electronic device may further include a rack gear 121 that is disposed parallel to a rear surface of the display. The camera module may include, on a side surface, a pinion gear 111 that corresponds to the rack gear, and the camera module may rotate according to a relative motion between the rack gear and the pinion gear.

The rack gear, the camera module, and the sliding part may linearly move together in a first section between the first position and the second position.

In a second section different from the first section, the rack gear may be fixed by a cleek 122 that is secured to the housing, and the camera module may perform a linear movement and rotation when the sliding part linearly moves.

A rotation angle of the camera module may be determined based on a length of the rack gear or a gear ratio between the rack gear and the pinion gear, and in the second section, the rack gear may be fixed by a cleek secured to the rear surface of the display.

The electronic device may further include a control button 127 that is disposed on a portion of the housing. When an input to the control button is received, the sliding part may slide from the first position to the second position, and the camera module may rotate to face the second direction from the first direction.

When an input to the control button is received while the sliding part is in the second position, the sliding part may slide from the second position to the first position, and the camera module may rotate to face the first direction from the second direction.

The camera module may be connected with a printed circuit board located in the housing, through a flexible printed circuit board 117, and the flexible printed circuit board may include a first portion parallel to a rotary shaft of the camera module and a second portion perpendicular to the rotary shaft.

The second portion of the flexible printed circuit board may be disposed to be wound around the rotary shaft of the camera module according to a rotation of the camera module.

An electronic device may include a housing including a first surface facing a first direction and a second surface facing a second direction opposite to the first direction, a display, at least part of which is received in the second surface of the housing, a sliding part including an opening and disposed on the first surface of the housing, in which the sliding part slides relative to the first surface, and a camera module disposed in the opening. The camera module may be configured to continue to face the first direction in a state of being mounted in the sliding part, while the sliding part moves from an initial position to a first position of the housing and rotate to face the second direction from the first direction, while the sliding part moves from the first position to a second position relative to the housing.

In the initial position, an upper end of the sliding part and an upper end of the housing may be disposed in alignment, and the upper end of the sliding part may further protrude upward beyond the upper end of the housing according to a movement.

The electronic device may further include an input device that receives a user input related to a movement of the sliding part and a controller that controls the movement of the sliding part in response to the user input.

When a user input for ending execution of a camera is received in a state in which the camera module faces the second direction, the controller may control the sliding part to slide from the second position to the initial position and may control the camera module to face the first direction from the second direction.

When a selfie function is executed, the controller may control the sliding part to slide from the initial position to the second position and may control the camera module to face the second direction in a state of facing the first direction.

Figure 9:
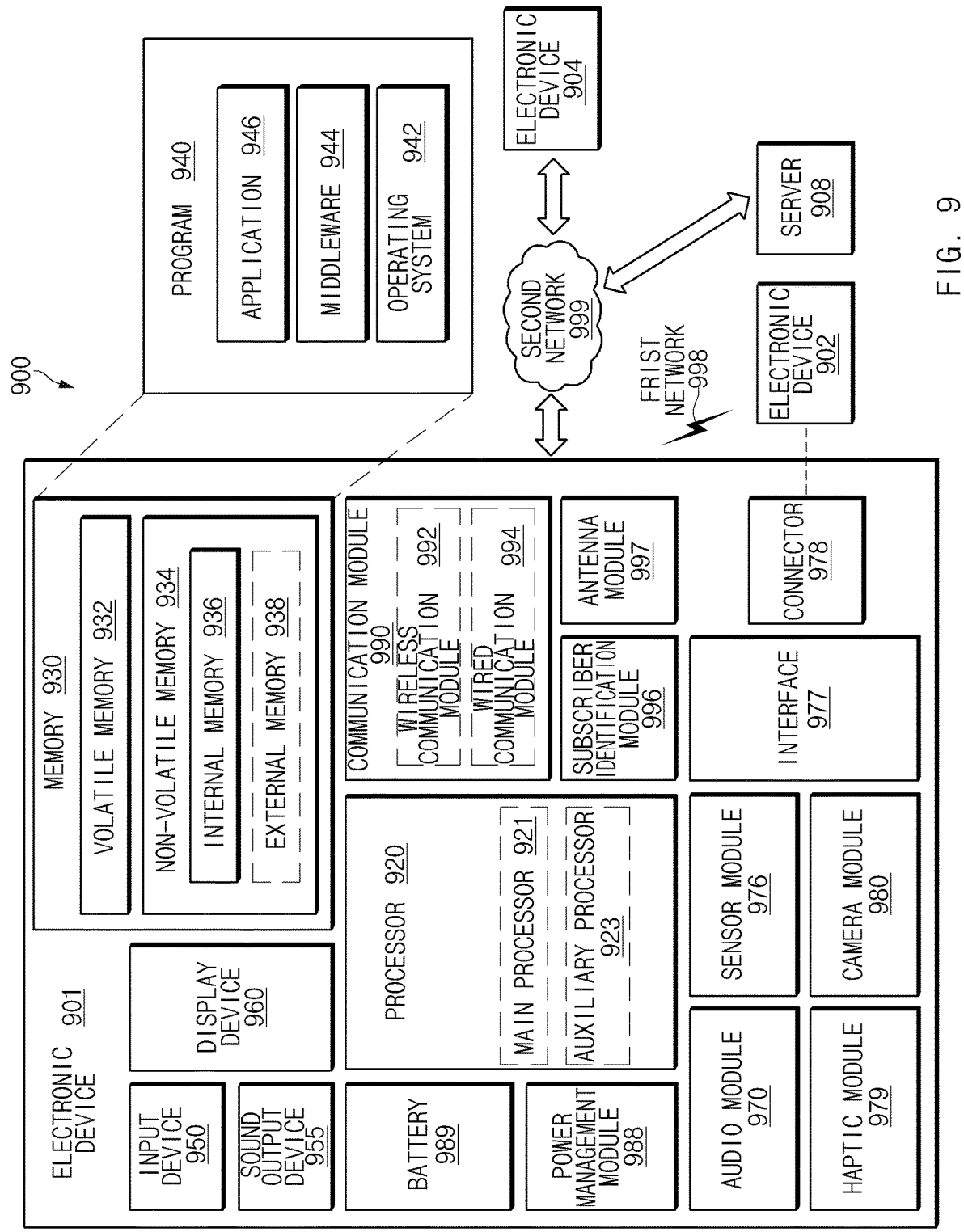
FIG. 9 is a block diagram illustrating an electronic device in a network environment, according to an embodiment.

FIG. 9 is a block diagram illustrating an electronic device 901 in a network environment 900 according to various embodiments. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In some embodiments, at least one (e.g., the display device 960 or the camera module 980) of the components may be omitted from the electronic device 901, or one or more other components may be added in the electronic device 901. In some embodiments, some of the components may be implemented as single integrated circuitry. For example, the sensor module 976 (e.g., a fingerprint sensor, an iris sensor, or an illuminance sensor) may be implemented as embedded in the display device 960 (e.g., a display).

The processor 920 may execute, for example, software (e.g., a program 940) to control at least one other component (e.g., a hardware or software component) of the electronic device 901 coupled with the processor 920, and may perform various data processing or computation. According to one embodiment, as at least part of the data processing or computation, the processor 920 may load a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, a keyboard, or a digital pen (e.g., a stylus pen).

The sound output device 955 may output sound signals to the outside of the electronic device 901. The sound output device 955 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to an embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to an embodiment, the audio module 970 may obtain the sound via the input device 950, or output the sound via the sound output device 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to one embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., PCB). According to an embodiment, the antenna module 997 may include a plurality of antennas. In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, one camera module may be used as a front camera and a rear camera, and thus the display of the electronic device may be expanded to a maximum size.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a display, at least part of which is included in the housing;
   a sliding part including an opening exposed to an outside area and configured to slide relative to the housing;
   a rack gear disposed parallel to a rear surface of the display; and
   a camera module disposed in the opening and configured to rotate relative to the sliding part by a pinion gear corresponding to the rack gear, the pinion gear is disposed on a side surface of the camera module,
   wherein the camera module is configured to:
   rotate to face a first direction, when the sliding part slides to a first position relative to the housing; and
   rotate to face a second direction different from the first direction, when the sliding part slides to a second position relative to the housing.

2. The electronic device of claim 1, wherein the display is disposed in the second direction.

3. The electronic device of claim 1, wherein an upper end of the sliding part in the first position is aligned side by side with an upper end of the display, and
   wherein the sliding part in the second position further protrudes beyond an upper portion of the housing.

4. The electronic device of claim 1, wherein the camera module operates as a rear camera in the first position and operates as a front camera in the second position.

5. The electronic device of claim 1, wherein the camera module linearly moves in a partial section between the first position and the second position and performs a linear movement and rotation in the remaining section.

6. The electronic device of claim 1, further comprising:
   a guide frame fixed to the housing; and
   a movable member configured to move along the guide frame, wherein a portion of the sliding part is coupled with the movable member.

7. The electronic device of claim 6, further comprising:
a motor; and
a rotary part configured to be rotated by the motor,
wherein the movable member performs a linearly reciprocating motion along the guide frame by a rotation of the rotary part.

8. The electronic device of claim 1,
wherein the camera module rotates according to a relative motion between the rack gear and the pinion gear.

9. The electronic device of claim 1, wherein the rack gear, the camera module, and the sliding part linearly move together in a first section between the first position and the second position.

10. The electronic device of claim 9, wherein in a second section different from the first section, the rack gear is fixed by a deck secured to the housing, and the camera module performs a linear movement and rotation when the sliding part linearly moves.

11. The electronic device of claim 10, wherein a rotation angle of the camera module is determined based on a length of the rack gear or a gear ratio between the rack gear and the pinion gear.

12. The electronic device of claim 1, further comprising:
a control button disposed on a portion of the housing,
wherein the sliding part slides from the first position to the second position and the camera module rotates to face the second direction from the first direction, when an input to the control button is received.

13. The electronic device of claim 12, wherein the sliding part slides from the second position to the first position and the camera module rotates to face the first direction from the second direction, when an input to the control button is received while the sliding part is in the second position.

14. The electronic device of claim 1, wherein the camera module is connected with a printed circuit board located in the housing, through a flexible printed circuit board, and
wherein the flexible printed circuit board includes a first portion parallel to a rotary shaft of the camera module and a second portion perpendicular to the rotary shaft.

15. The electronic device of claim 14, wherein the second portion of the flexible printed circuit board is disposed to be wound around the rotary shaft of the camera module according to a rotation of the camera module.

16. An electronic device comprising:
a housing including a first surface facing a first direction and a second surface facing a second direction opposite to the first direction;
a display, at least part of which is included in the second surface of the housing;
a sliding part including an opening and disposed on the first surface of the housing, the sliding part being configured to slide relative to the first surface;
a rack gear disposed parallel to a rear surface of the display; and
a camera module disposed in the opening and configured to rotate relative to the sliding part by a pinion gear corresponding to the rack gear, the pinion gear is disposed on a side surface of the camera module,
wherein the camera module is configured to:
continue to face the first direction in a state of being mounted in the sliding part, while the sliding part moves from an initial position to a first position of the housing; and
rotate to face the second direction from the first direction, while the sliding part moves from the first position to a second position relative to the housing.

17. The electronic device of claim 16, wherein in the initial position, an upper end of the sliding part and an upper end of the housing are disposed in alignment, and
wherein the upper end of the sliding part further protrudes upward beyond the upper end of the housing according to a movement.

18. The electronic device of claim 16, further comprising:
an input device configured to receive a user input related to a movement of the sliding part; and
a controller configured to control the movement of the sliding part in response to the user input.

19. The electronic device of claim 18, wherein the controller controls the sliding part to slide from the second position to the initial position and controls the camera module to face the first direction from the second direction, when a user input for ending execution of a camera is received in a state in which the camera module faces the second direction.

20. The electronic device of claim 18, wherein the controller controls the sliding part to slide from the initial position to the second position and controls the camera module to face the second direction in a state of facing the first direction, when a selfie function is executed.

* * * * *